(12) United States Patent
Diamand et al.

(10) Patent No.: US 10,204,047 B2
(45) Date of Patent: Feb. 12, 2019

(54) MEMORY CONTROLLER FOR MULTI-LEVEL SYSTEM MEMORY WITH COHERENCY UNIT

(71) Applicant: Intel Corporation, Santa Clara, CA (US)

(72) Inventors: Israel Diamand, Aderet (IL); Nir Misgav, Netania (IL); Aravindh Anantaraman, Folsom, CA (US); Zvika Greenfield, Kfar Sava (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/671,892

(22) Filed: Mar. 27, 2015

(65) Prior Publication Data
US 2016/0283389 A1 Sep. 29, 2016

(51) Int. Cl.
*G06F 12/0811* (2016.01)

(52) U.S. Cl.
CPC ............................. *G06F 12/0811* (2013.01)

(58) Field of Classification Search
CPC ........... G06F 12/00; G06F 13/00; G06F 11/00
See application file for complete search history.

(56) References Cited

U.S. PATENT DOCUMENTS

| | | | |
|---|---|---|---|
| 5,623,628 A * | 4/1997 | Brayton | G06F 12/0831 710/39 |
| 5,912,839 A | 6/1999 | Ovshinsky et al. | |
| 6,122,715 A * | 9/2000 | Palanca | G06F 12/0804 711/154 |
| 6,535,958 B1 * | 3/2003 | Fuoco | G06F 12/0802 711/122 |
| 7,590,918 B2 | 9/2009 | Parkinson | |
| 7,600,078 B1 | 10/2009 | Cen et al. | |
| 7,756,053 B2 | 7/2010 | Thomas et al. | |

(Continued)

FOREIGN PATENT DOCUMENTS

WO 2010132655 A2 11/2010

OTHER PUBLICATIONS

Lee et al., "Architecting Phase Change Memory as a Scalable DRAM Alternative", ISCA '09, Jun. 20, 2009, 12 pgs., Austin, Texas, USA.

(Continued)

*Primary Examiner* — Charles Rones
*Assistant Examiner* — Han V Doan
(74) *Attorney, Agent, or Firm* — Compass IP Law PC

(57) ABSTRACT

An apparatus is described that includes a memory controller having an interface to couple to a multi-level system memory. The memory controller also includes a coherency buffer and coherency services logic circuitry. The coherency buffer is to keep cache lines for which read and/or write requests have been received. The coherency services logic circuitry is coupled to the interface and the coherency buffer. The coherency services logic circuitry is to merge a cache line that has been evicted from a level of the multi-level system memory with another version of the cache line within the coherency buffer before writing the cache line back to a deeper level of the multi-level system memory if at least one of the following is true: the another version of said cache line is in a modified state; the memory controller has a pending write request for the cache line.

27 Claims, 18 Drawing Sheets

(56) References Cited

U.S. PATENT DOCUMENTS

| | | | |
|---|---|---|---|
| 7,913,147 | B2 | 3/2011 | Swaminathan et al. |
| 8,051,253 | B2 | 11/2011 | Okin et al. |
| 8,462,537 | B2 | 6/2013 | Karpov et al. |
| 8,462,577 | B2 | 6/2013 | Zeng et al. |
| 8,463,948 | B1 | 6/2013 | Qawami et al. |
| 8,612,676 | B2 | 6/2013 | Dahlen et al. |
| 8,605,531 | B2 | 12/2013 | Kau et al. |
| 8,607,089 | B2 | 12/2013 | Qawami et al. |
| 8,612,809 | B2 | 12/2013 | Casper et al. |
| 8,649,212 | B2 | 2/2014 | Kau et al. |
| 8,838,935 | B2 | 9/2014 | Hinton |
| 9,378,133 | B2 | 6/2016 | Nachimuthu et al. |
| 9,430,372 | B2 | 8/2016 | Nachimuthu et al. |
| 2003/0200408 | A1* | 10/2003 | Mekhiel ............. G06F 12/0215 711/167 |
| 2007/0005922 | A1 | 1/2007 | Swaninathan et al. |
| 2007/0079070 | A1* | 4/2007 | Piry ............. G06F 12/0804 711/118 |
| 2007/0266206 | A1* | 11/2007 | Kim ............. G06F 12/0817 711/118 |
| 2008/0016269 | A1 | 1/2008 | Chow et al. |
| 2008/0034148 | A1 | 2/2008 | Gower |
| 2008/0270811 | A1 | 10/2008 | Chow et al. |
| 2009/0313416 | A1 | 12/2009 | Nation |
| 2010/0017556 | A1* | 1/2010 | Chin ............. G06F 12/0246 711/103 |
| 2010/0110748 | A1 | 5/2010 | Best |
| 2010/0131827 | A1 | 5/2010 | Sokolov |
| 2010/0268884 | A1 | 10/2010 | Cummings et al. |
| 2010/0291867 | A1 | 11/2010 | Abdulla et al. |
| 2010/0293317 | A1 | 11/2010 | Confalonieri et al. |
| 2010/0306446 | A1 | 12/2010 | Villa et al. |
| 2010/0306453 | A1 | 12/2010 | Doller |
| 2010/0318718 | A1 | 12/2010 | Eilert et al. |
| 2011/0153916 | A1 | 6/2011 | Chinnaswamy et al. |
| 2011/0208900 | A1 | 8/2011 | Schuette et al. |
| 2011/0291884 | A1 | 12/2011 | Oh et al. |
| 2012/0254507 | A1* | 10/2012 | Chang ............. G06F 12/0868 711/103 |
| 2013/0275661 | A1 | 10/2013 | Zimmer et al. |
| 2013/0275682 | A1 | 10/2013 | Ramanujan et al. |
| 2013/0282967 | A1 | 10/2013 | Ramanujan |
| 2013/0290597 | A1 | 10/2013 | Faber |
| 2014/0040550 | A1 | 2/2014 | Nale et al. |
| 2014/0075107 | A1 | 3/2014 | Qawami et al. |
| 2014/0129767 | A1 | 5/2014 | Ramanujan et al. |
| 2014/0181403 | A1 | 6/2014 | Lilly et al. |
| 2014/0297938 | A1 | 10/2014 | Puthiyedath et al. |
| 2015/0006805 | A1 | 1/2015 | Feekes et al. |
| 2015/0019824 | A1 | 1/2015 | Lilly et al. |
| 2015/0186275 | A1 | 7/2015 | Moga et al. |
| 2015/0199272 | A1* | 7/2015 | Goel ............. G06F 12/0891 711/133 |

OTHER PUBLICATIONS

Condit et al., "Better I/O Through Byte-Addressable, Persistent Memory", SOSP '09, Oct. 11, 2009, pp. 133-146. Big Sky, Montana, USA.

Freitas et al., "Storage-class memory: The next storage system technology", IBM J. Res. & Dev., Jul./Sep. 2008, pp. 439-447, vol. 52, No. 4/5.

Akel et al., "Onyx: A Prototype Phase Change Memory Storage Array",www.flashmemorysummit.com/ . . . /Proceeding_2011/08/11_S301_Akel.pdf, 5 pgs.

Mearian, "IBM announces computer memory breakthrough Phase-change memory offers 100 times the write performance of NAND flash", Jun. 30, 2011, 3 pgs.

Caulfield et al., "Moneta: A High-performance Storage Array Architecture for Next-generation, Non-volatile Memories", Micro 43: Proceedings of the 43rd Annual IEEE/ACM International Symposium on Microarchitecture, Atlanta, GA Dec. 2010 pp. 385-395.

"The Non-Volatile Systems Laboratory Coding for non-volatile memories", http://nvsl.ucsd.edu/ecc, printed Sep. 1, 2011. 2 pgs.

"The Non-Volatile Systems Laboratory Moneta and Onyx: Very Fast SS", http://nvsl.ucsd.edu/moneta/, 3 pgs., Sep. 1, 2011.

"The Non-Volatile Systems Laboratory NV-Heaps: Fast and Safe Persistent Objects", http://nvsl.ucsd.edu/nvuheaps/, 2 pgs., Sep. 1, 2011.

"Phase change memory-based 'moneta' system points to the future of computer storage", ScienceBlog, Jun. 2, 2011, 7 pgs.

Quereshi et al., "Scalable High Performance Main Memory System Using Phase-Change Memory Technology", ISCA '09, Jun. 20, 2009, 10 pgs., Austin, Texas, USA.

Kant, Dr. Krishna, "Exploiting NVRAM for Building Multi-Level Memory Systems", International Workshop on Operating System Technologies for Large Scale NVRAM, Oct. 21, 2008, Jeju, Korea, 19 pages.

Bailey et al., "Operating System Implications of Fast, Cheap, Non-Volatile Memory" 13th USENIX, HOTOS11 2011, May 9-11, 2011, 5 pgs.

Raoux et al., "Phase-change random access memory: A scalable technology", IBM J. Res. & Dev., Jul./ Sep. 2008, pp. 465-479, vol. 52, No. 4/5.

Chen et al., "Rethinking Database Algorithms for Phase Change Memory", 5th Biennial Conference on Innovative Data Systems Research (CIDR '11), Jan. 9, 2011, 11 pgs., Asilomar, California, USA.

Jacob et al., "The Memory System You Can't Avoid It, You Can't Ignore It, You Can't Fake It", 2009, 77 pgs., Morgan & Claypool.

Mogul et al., "Operating System Support for NVM+DRAM Hybrid Main Memory", 12th Workshop on Hot Topics in Operating Systems (HatOS XII), May 18, 2009, 9 pgs.

International Search Report and Written Opinion from co-pending PCT/US2016/018488, dated May 31, 2016, 11 pages total.

Wu, et al., "eNVy: A Non-Volatile, Main Memory Storage System" 1994 ACM., ASPLOS VI. pp. 86-97.

Dhiman, et al. "PDRAM: A Hybrid PRAM and DRAM Main Memory System", Jul. 26, 2009, Department of Computer Science and Engineering, 6 pages.

* cited by examiner

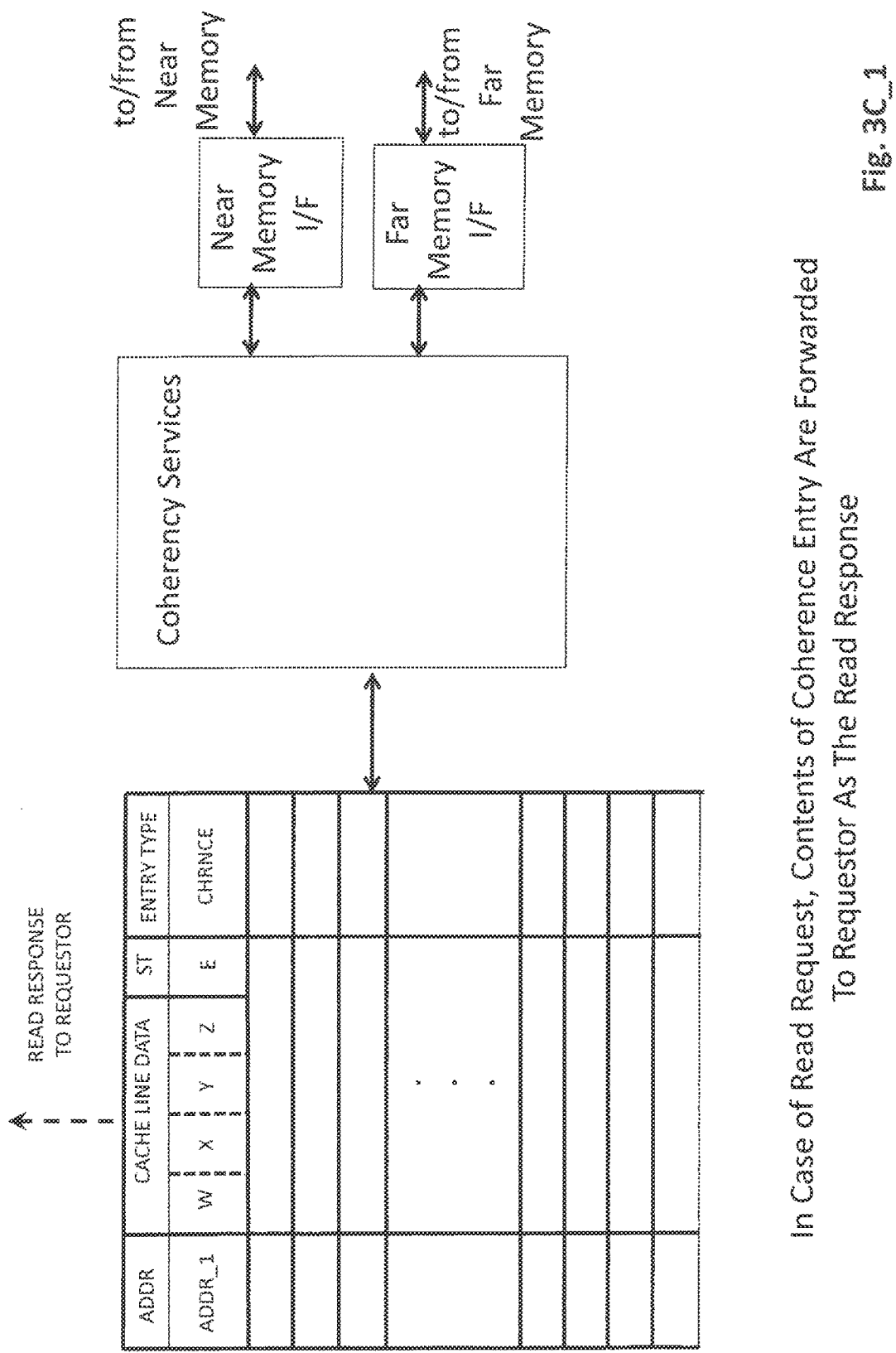
Fig. 3C_1
In Case of Read Request, Contents of Coherence Entry Are Forwarded To Requestor As The Read Response

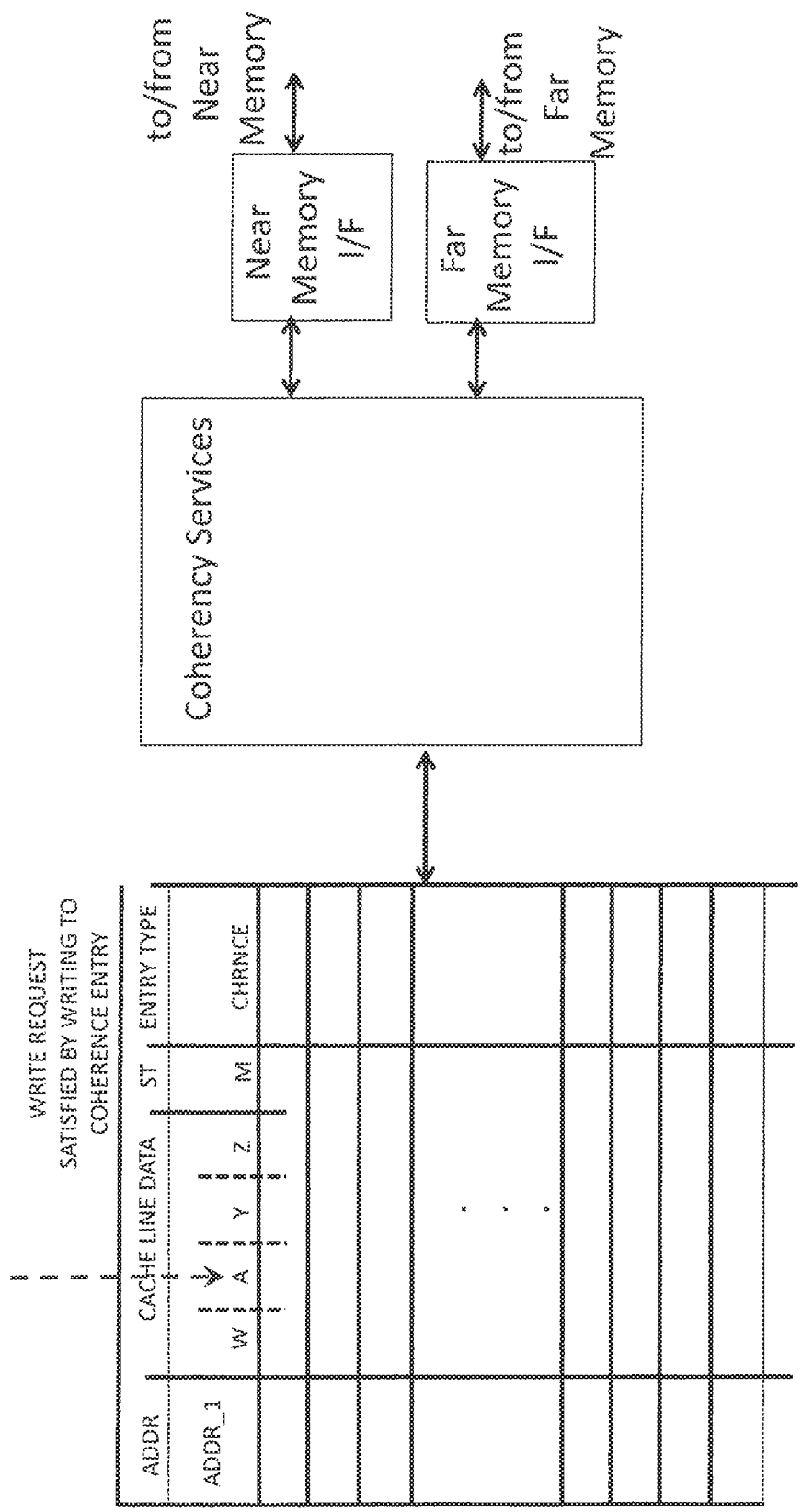
Fig. 3C_2
In Case of Write Request, Contents of Coherence Entry Are Written Over With New Data In Case of Multiple Read Requests After A Write Request, Contents of Coherence Entry After Write Are Forwarded To Each Requestor As Read Response In Case of Multiple Write And Read Requests, Writes To The Coherence Entry Are Performed Before Reads Cache Line Being Evicted From Near Memory Has Address That Matches Coherence Entry
Coherence Entry Not in M state;
Cache Line Written Back to Far Memory w/o Merger With Coherence Entry if in M state Cache Line Being Evicted From Near Memory Has Address That Matches Coherence Entry Coherence Entry in the M state; Cache Line Merged With Coherence Entry and Written Back to Far Memory

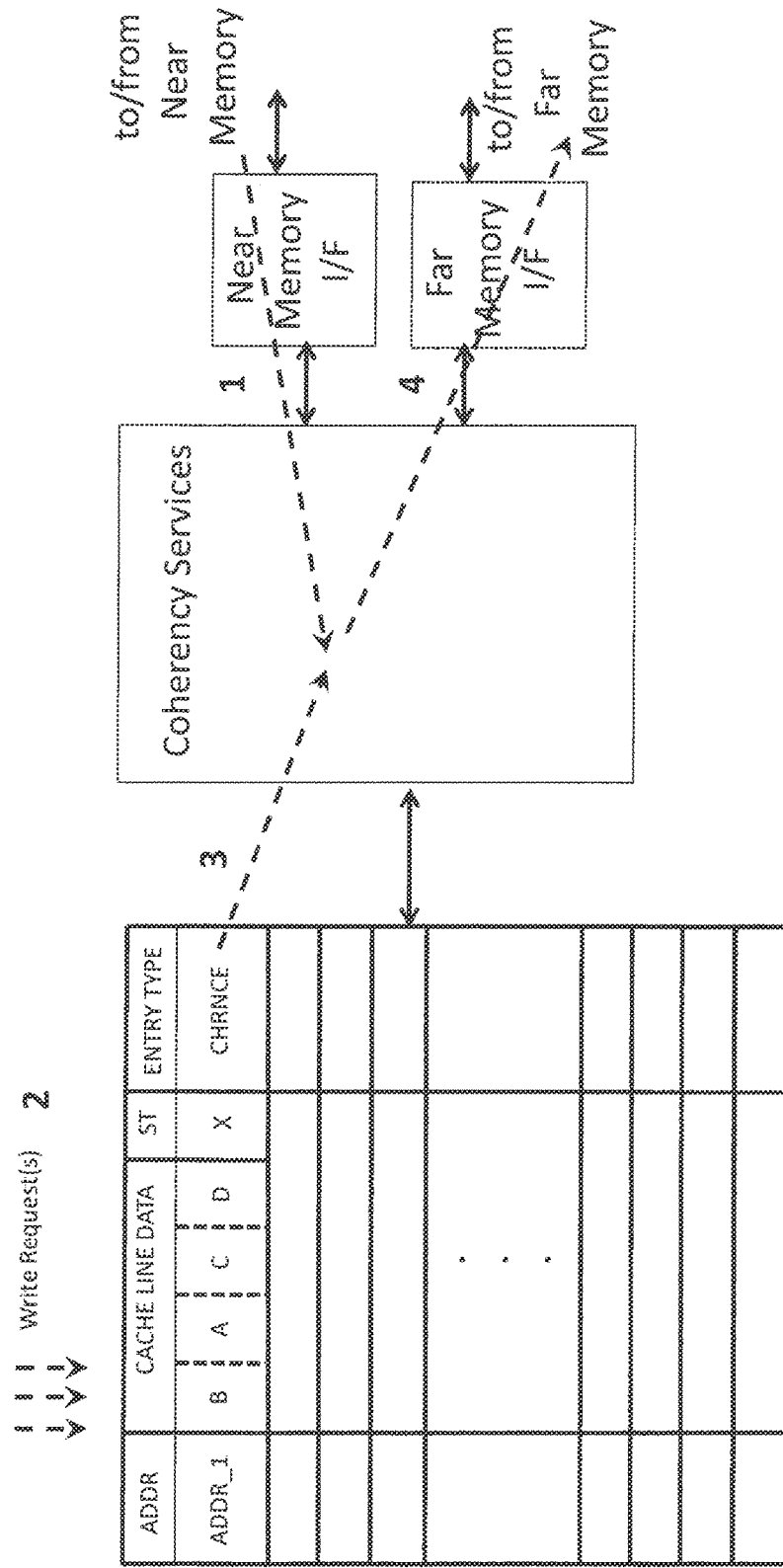

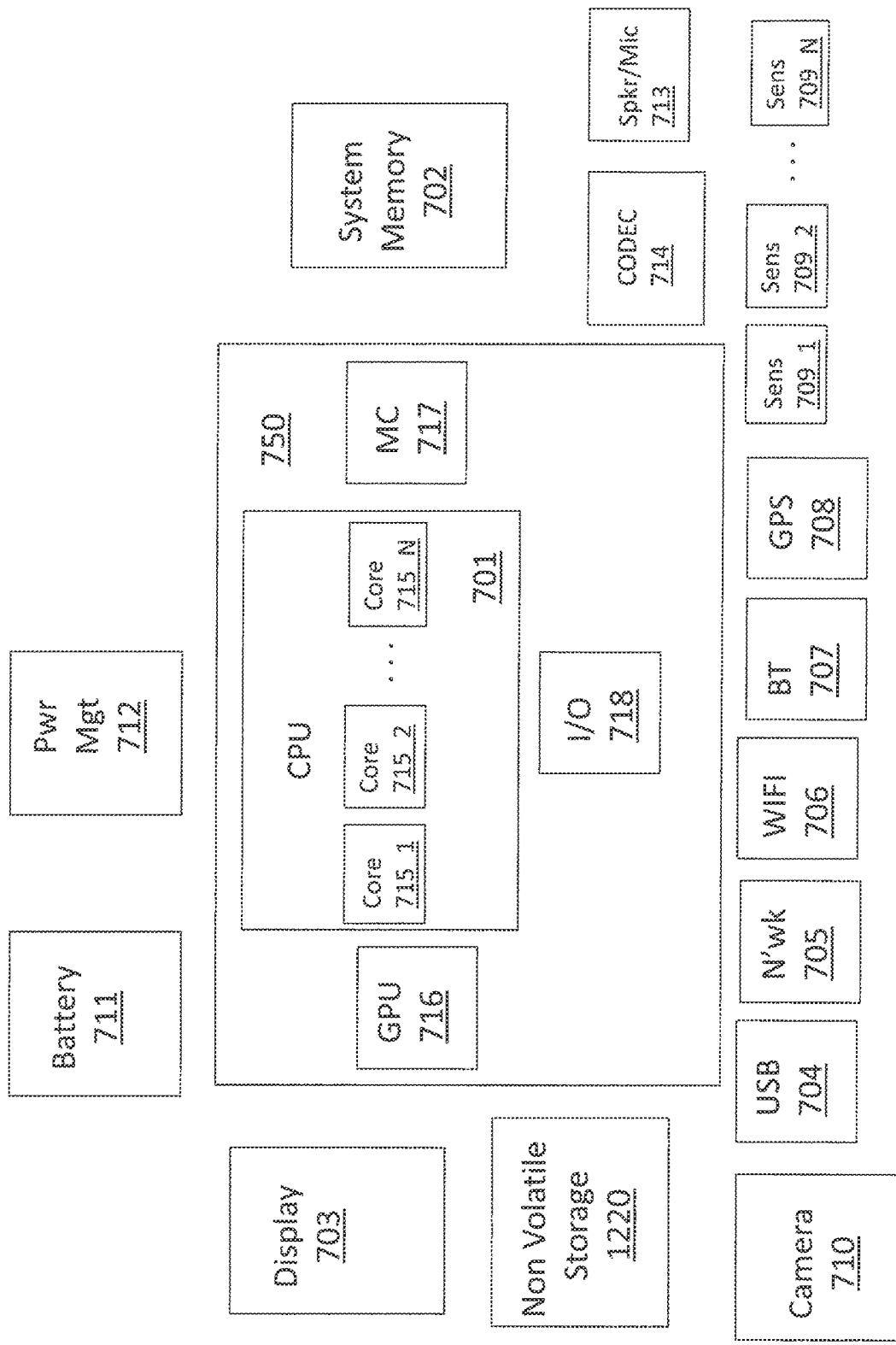

MEMORY CONTROLLER FOR MULTI-LEVEL SYSTEM MEMORY WITH COHERENCY UNIT

FIELD OF INVENTION

The field of invention pertains generally to the computing sciences; and, more specifically, to a memory controller for multi-level system memory with coherency unit.

BACKGROUND

Computing systems typically include system memory (or main memory) that contains data and program code of the software code that the system's processor(s) are currently executing. A pertinent bottleneck in many computer systems is the system memory. Here, as is understood in the art, a computing system operates by executing program code stored in system memory. The program code when executed reads and writes data from/to system memory. As such, system memory is heavily utilized with many program codes and data reads as well as many data writes over the course of the computing system's operation. Finding ways to speed-up system memory is therefore a motivation of computing system engineers.

LIST OF FIGURES

A better understanding of the present invention can be obtained from the following detailed description in conjunction with the following drawings, in which.

Figure 3A:
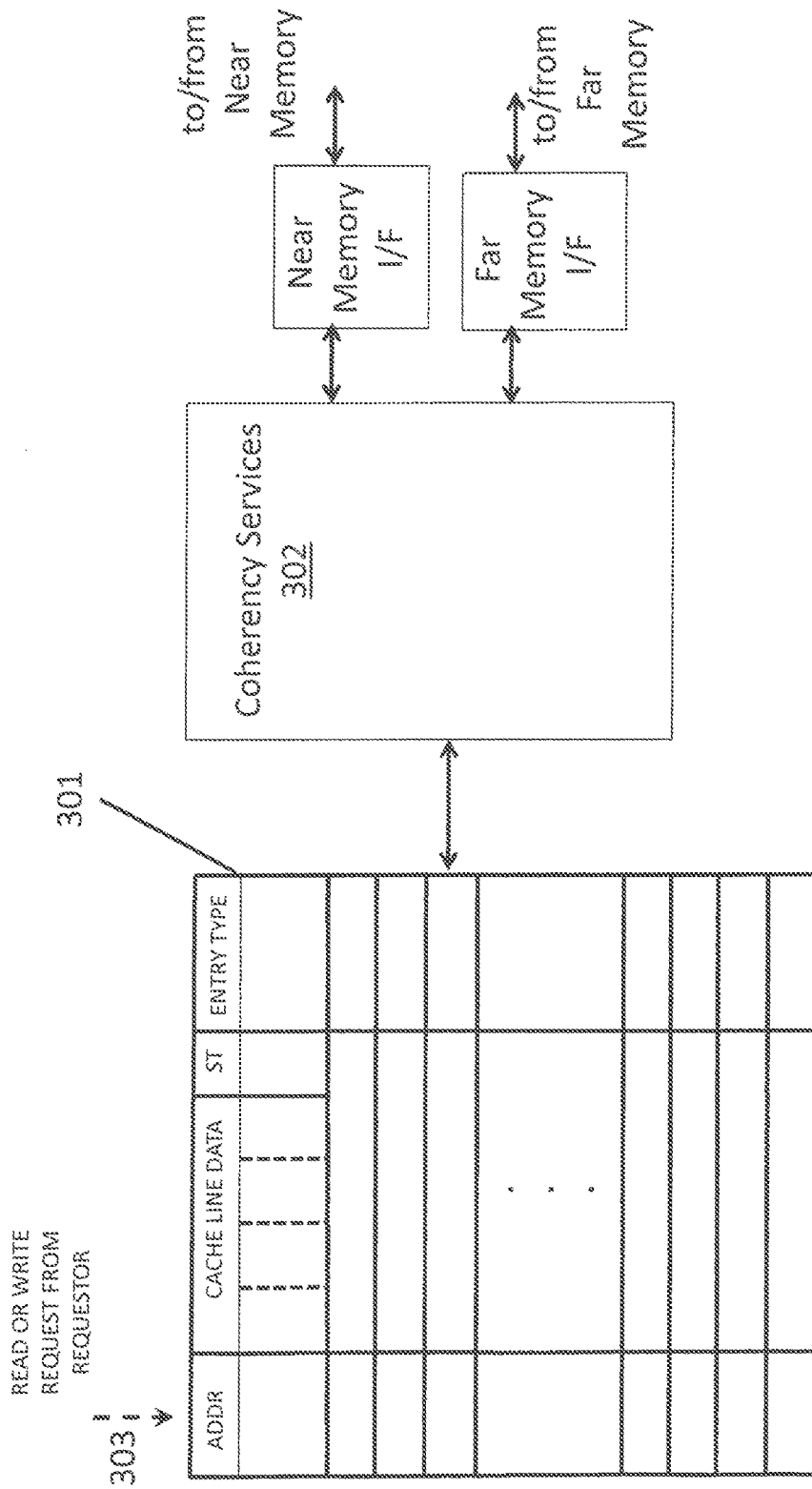
Figure 3B:
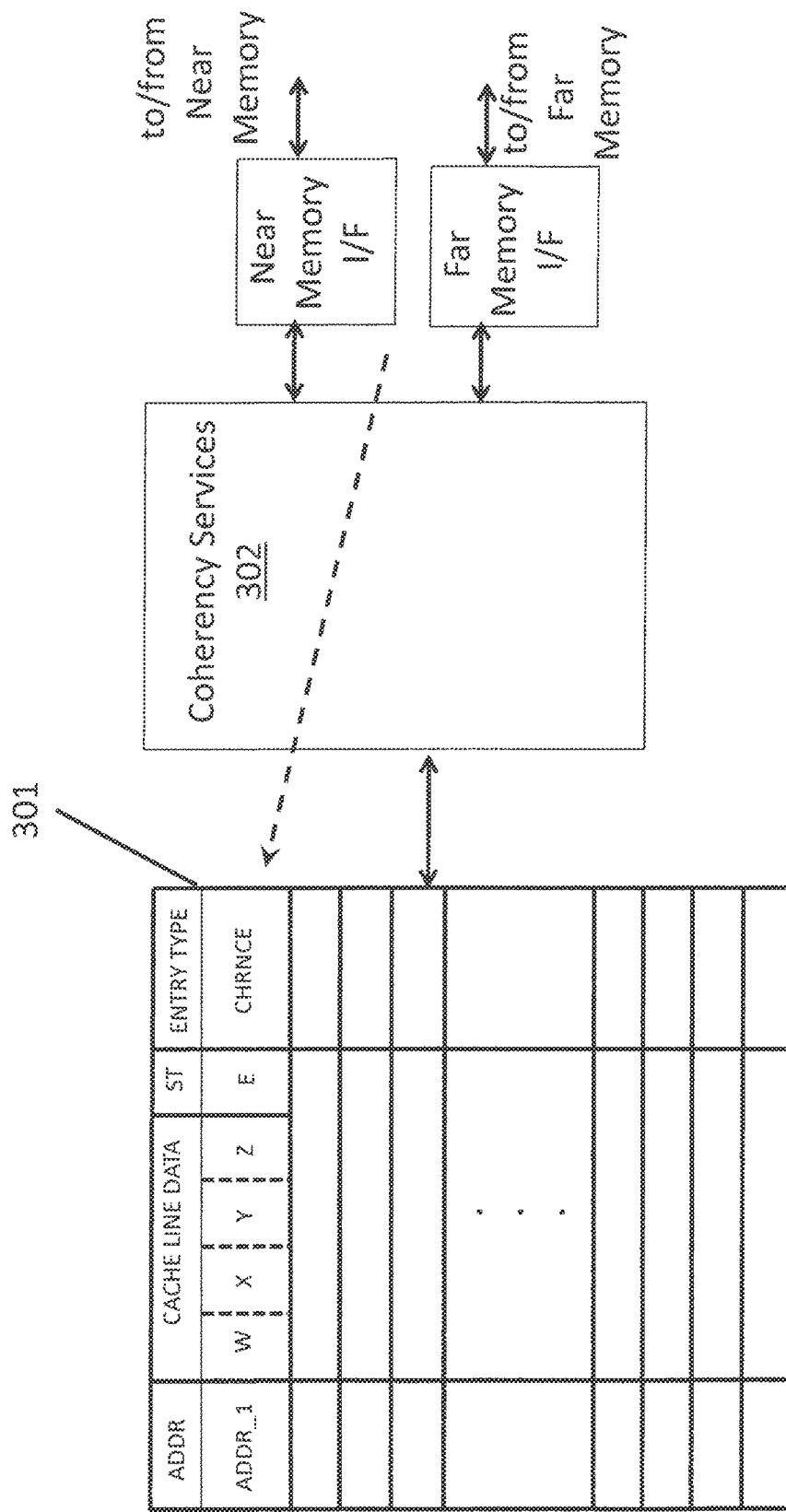
Figure 6:
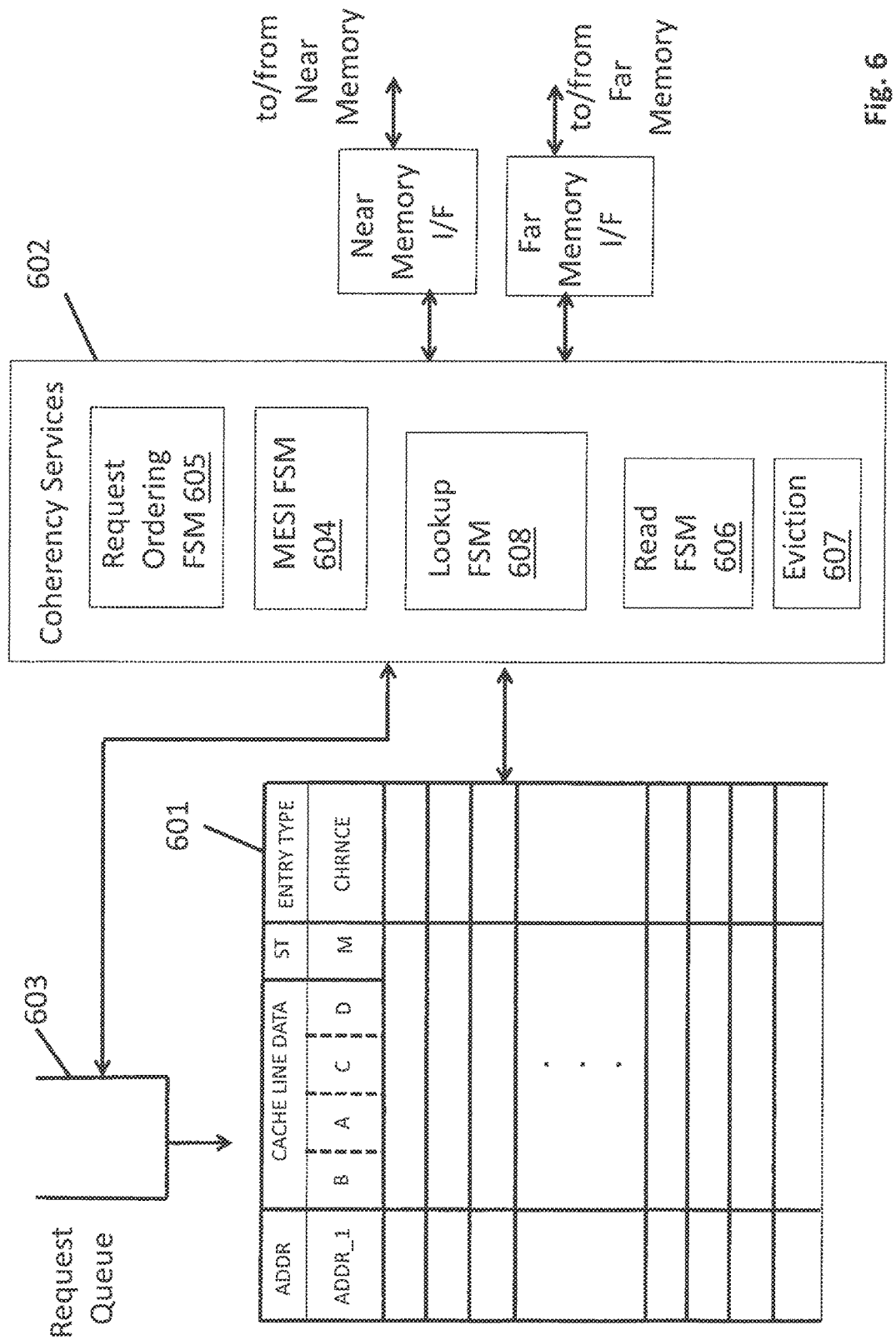

FIGS. 3A, 3B, 3C_1 and 3C_2 pertain to basic read and write request handling;

FIGS. 4A, 4B, 4C and 4D pertain to handling of multiple read and write requests;

FIGS. 5A, 5B, 5C and 5D pertain to handling of evictions from a higher system memory level;

FIG. 6 depict an embodiment of a design for a memory controller having a coherency unit;

FIG. 7 depicts a computing system.

DESCRIPTION

Figure 1:
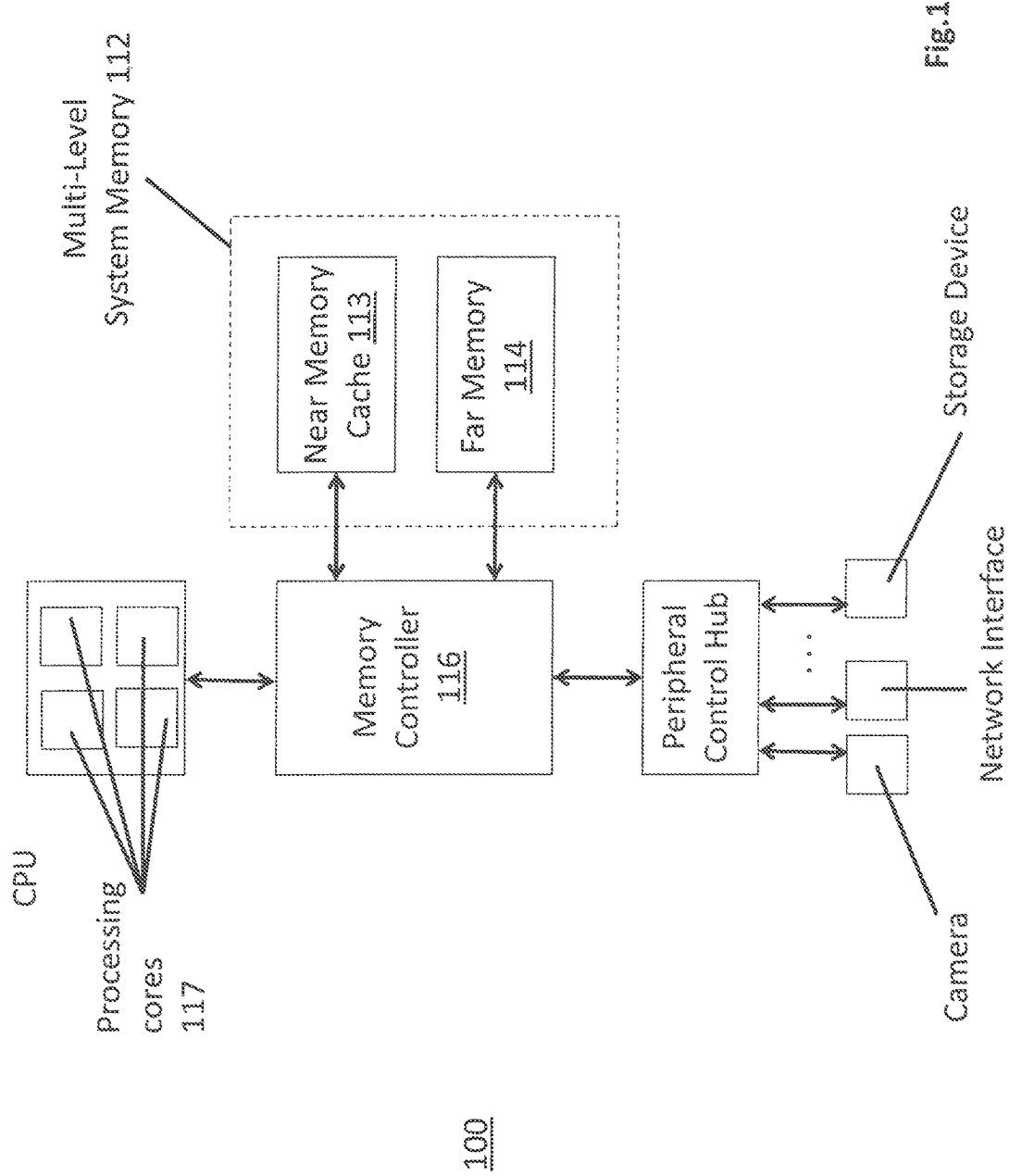
FIG. 1 shows a computing system with a multi-level system memory.

One of the ways to speed-up system memory is to have a memory side cache. FIG. 1 shows an embodiment of a computing system 100 having a multi-tiered or multi-level system memory 112 that results from the use of a memory side cache. A memory side cache (near memory cache 113) is used to store the system memory items that are (and/or are expected to be) the items that are and/or will be more frequently called upon by the computing system. The near memory cache 113 has lower access times than the lower tiered system memory component (far memory 114). By storing the more frequently called upon items in near memory, the system memory will be observed as faster because the system will often read items that are being stored in faster near memory 113.

According to some embodiments, for example, the near memory 113 exhibits reduced access times by having a faster clock speed than the far memory 114. Here, the near memory 113 may be a faster, volatile system memory technology (e.g., high performance dynamic random access memory (DRAM)). By contrast, far memory 114 may be either a volatile memory technology implemented with a slower clock speed (e.g., a DRAM component that receives a slower clock) or, e.g., a non volatile memory technology that is inherently slower than volatile/DRAM memory.

For example, the lower level 114 may be comprised of an emerging non volatile byte addressable random access memory technology such as, to name a few possibilities, a phase change based memory, a ferro-electric based memory (e.g., FRAM), a magnetic based memory (e.g., MRAM), a spin transfer torque based memory (e.g., STT-RAM), a resistor based memory (e.g., ReRAM) or a "Memristor" based memory. Such emerging non volatile random access memories technologies typically have some combination of the following: 1) higher storage densities than DRAM (e.g., by being constructed in three-dimensional (3D) circuit structures (e.g., a crosspoint 3D circuit structure); 2) lower power consumption densities than DRAM (e.g., because they do not need refreshing); and/or 3) access latency that is slower than DRAM yet still faster than traditional non-volatile memory technologies such as FLASH. The later characteristic in particular permits an emerging non volatile memory technology to be used in a main system memory role rather than a traditional storage role (which is the traditional architectural location of non volatile storage).

Regardless of whether far memory 214 is composed of a volatile or non volatile memory technology, in various embodiments far memory 214 acts as a true system memory in that it supports finer grained data accesses (e.g., cache lines) rather than larger blocked based accesses associated with traditional, deeper non volatile storage (e.g., solid state drive (SSD), hard disk drive (HDD)), and/or, otherwise acts as an (e.g., byte) addressable memory that the program code being executed by processor(s) of the CPU operate out of.

Because near memory 113 acts as a cache, near memory 113 may not have its own individual addressing space. Rather, only far memory 114 includes the individually addressable memory space of the computing system's main memory. In various embodiments near memory 113 truly acts as a cache for far memory 114 rather than acting a last level CPU cache. Generally, a CPU level cache is able to keep cache lines across the entirety of system memory addressing space that is made available to the processing cores 117 that are integrated on a same semiconductor chip as the memory controller 116.

For example, in various embodiments, system memory is implemented with dual in-line memory module (DIMM) cards where a single DIMM card has both DRAM and (e.g., emerging) non volatile memory chips and the DRAM chips effectively act as an on board cache for the non volatile memory chips. Ideally, the more frequently accessed cache lines of any particular DIMM card will be found on that DIMM card's DRAM chips rather than its non volatile memory chips. Given that multiple DIMM cards are typically plugged into a working computing system and each DIMM card is only given a section of the system memory addresses made available to the processing cores 117 of the semiconductor chip that the DIMM cards are coupled to, the DRAM chips are acting as a cache for the non volatile memory that they share a DIMM card with rather than a last level CPU cache.

In other configurations DIMM cards having only DRAM chips may be plugged into a same system memory channel (e.g., a DDR channel) with DIMM cards having only non volatile system memory chips. Ideally, the more frequently used cache lines of the channel will be found in the DRAM DIMM cards rather than the non volatile memory DIMM cards. Thus, again, because there are typically multiple memory channels coupled to a same semiconductor chip having multiple processing cores, the DRAM chips are acting as a cache for the non volatile memory chips that they share a same channel with rather than as a last level CPU cache. Although the above example referred to packaging solutions that included DIMM cards, it is pertinent to note that this is just one example and other embodiments may use other packaging solutions (e.g., stacked chip technology, one or more DRAM and phase change memories integrated on a same semiconductor die or at least within a same package as the processing core(s), etc.).

Figure 2A:
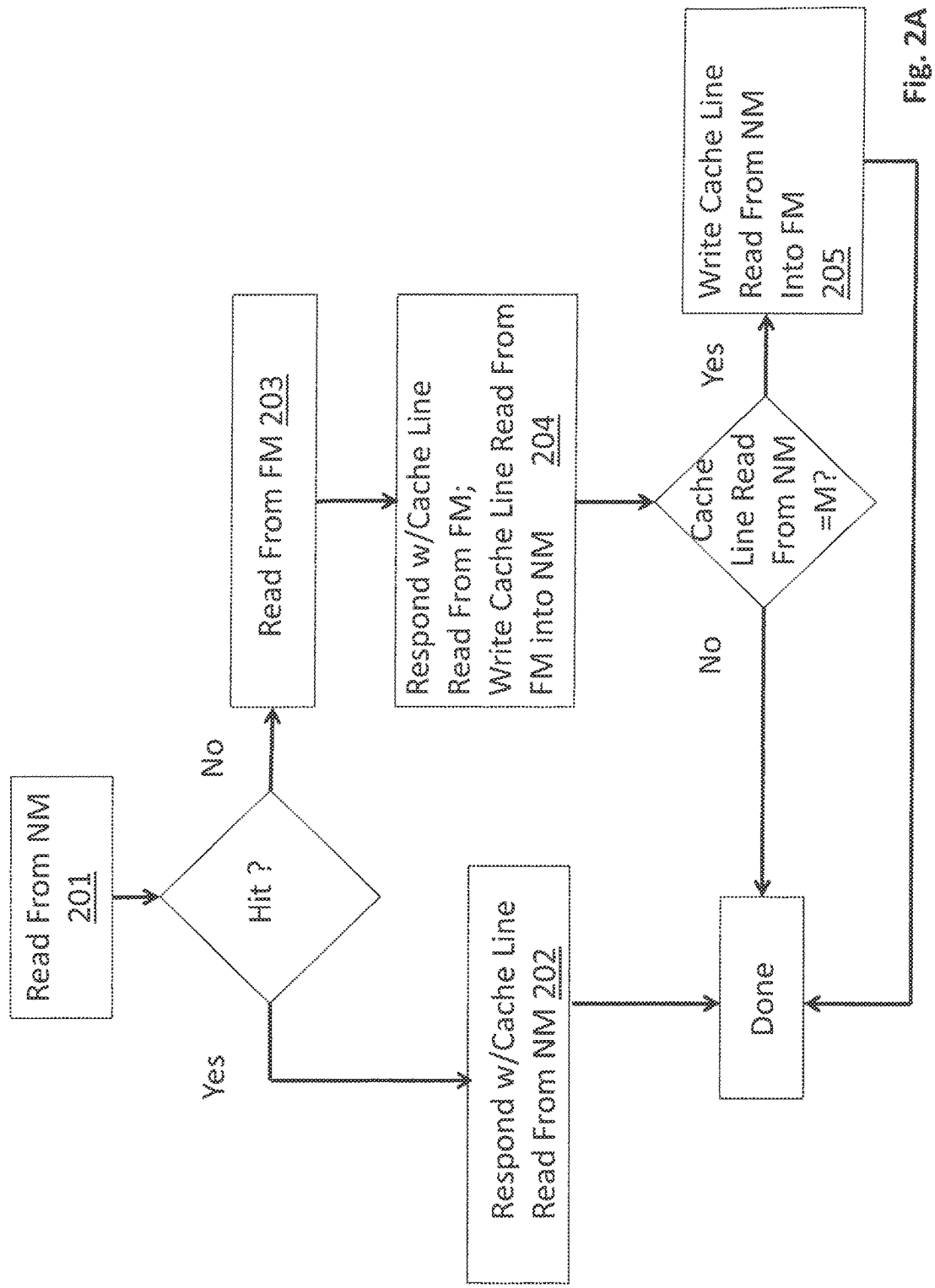
FIG. 2A shows a multi-level system memory read process.
Figure 2B:
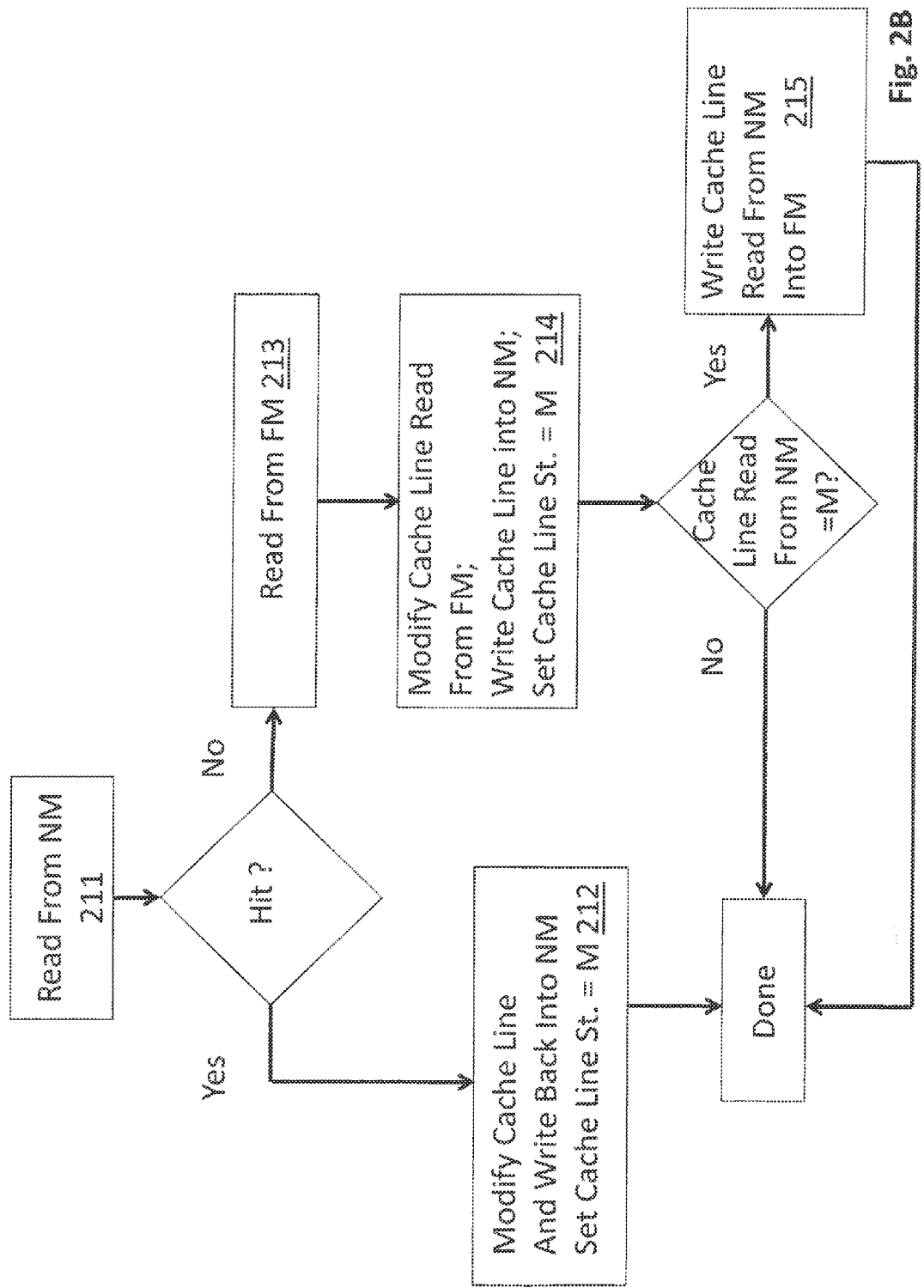
FIG. 2B shows a multi-level system memory write process.

FIGS. 2A and 2B show some basic processes of a multi-tiered system memory where the near memory acts as a cache for the far memory. FIG. 2A shows a system memory read process. FIG. 2B shows a system memory write process.

Referring to the system memory read process of FIG. 2A, upon receipt of a system memory read request from a requestor (which is typically a thread of program code executing on a processing core), a lookup 201 into near memory is first performed. Here, the lookup 201 into near memory essentially corresponds to a lookup into cache. If the lookup 201 into near memory is a hit (the requested cache line is found in near memory), the cache line is forwarded to the requestor 202. By contrast, if the requested cache line is not found in near memory, a read into far memory is performed to fetch the requested cache line 203. The retrieved cache line is forwarded to the requestor and put into near memory 204.

Here, the placement into near memory of the cache line read from far memory corresponds to placement into cache of a cache line that has most recently been accessed. The placement of the cache line into near memory cache may also correspond to eviction of another cache line from the cache into far memory. That is, the newly accessed cache line may effectively "bump out" another cache line that was in near memory. As just one example, in an embodiment near memory is implemented as a direct mapped cache having multiple "slots" where any cache line supported by the near memory cache can be stored in only one of the slots. In this case, the initial lookup into cache 201 was performed by reading the cache line from the slot that the requested cache line mapped to. Since the cache line read from near memory was not the requested cache line (cache miss), the cache line read from near memory now needs to be put into far memory 205 so that the requested cache line can consume its slot in near memory.

In various embodiments, the cache line being evicted from near memory only needs to be put into far memory if it has a modified state (M). Here, a modified state means the cache line has the most recent data for the cache line. If a cache line having an M state were to be dropped, data consistency problems would result because the most up to date information for the cache line would be lost. Thus, in various embodiments, a cache line that is evicted from near memory is only written back to far memory if it has an M state. Other cache line states (e.g., Exclusive (E), Shared (S) or Invalid (I)) effectively mean there exists a duplicate copy of the cache line in far memory and can therefore be dropped without a data consistency penalty.

Generally, anytime new information is written to a cache line the cache line will assume the M state. Here, the writing of the new information means that the duplicate copy in far memory is "stale" and can no longer be used as its replacement should it be deleted. As such, rather than delete an evicted cache line in the M state it is written back to far memory so that the latest information for the cache line is preserved. In various embodiments a cache line is marked as being in the M state if a reserved "dirty bit" for the cache line is set. Thus, if a cache line that is evicted from near memory has its dirty bit set, the cache line is written back to far memory (the set dirty bit signifying that the cache line has an M state).

FIG. 2B shows a system memory write process. A write request and corresponding cache line having new information to be written into the cache line is received from a requestor. A lookup is then made into near memory for the cache line 211. If there is a cache hit, the new information that was appended with the request is written into the cache line and the resultant is written back into near memory 212 (if the request is for only a partial write only the portions of the cache line specified in the write request are written). If the matching cache line that was found in near memory was not already in the M state the writing of the new information into the cache line will cause the cache line to be placed into the M state (e.g., by setting its dirty bit).

If the cache line is not found in near memory (cache miss), the requested cache line is fetched from far memory 213, written over with the new information associated with the write request and then written into near memory 214. Alternatively, a duplicate copy may also be written into far memory so that the copy written into near memory does not have an M state. If no such copy is written into far memory the version written into near memory will have the M state. The same handling of any cache line evicted from near memory as a consequence of writing the newly modified cache line into near memory also transpires 215 (write back of evicted cache line into far memory if it has an M state). Note that in various embodiments the write request granularity may be smaller than the caching granularity. For example, the write may only target one addressable data item in the cache line while the cache line effectively is a grouping of more than one individually addressable data item.

FIG. 2A depicts the eviction of an M cache line from near memory and its write-back into far memory as a consequence of read request cache miss. FIG. 2B depicts the eviction of an M cache line from near memory and its write-back into far memory as a consequence of a write request cache miss. It is pertinent to point out that other activities may trigger the eviction of an M cache line from near memory and its write-back into far memory. Examples include back ground software and hardware processes that "flush" whole sections or the entirety of a near memory cache. Another example is where near memory is "sectored" such that cache lines are grouped. As such, an eviction event for one cache line in the group triggers the eviction of all cache lines in the group.

Figure 2C:
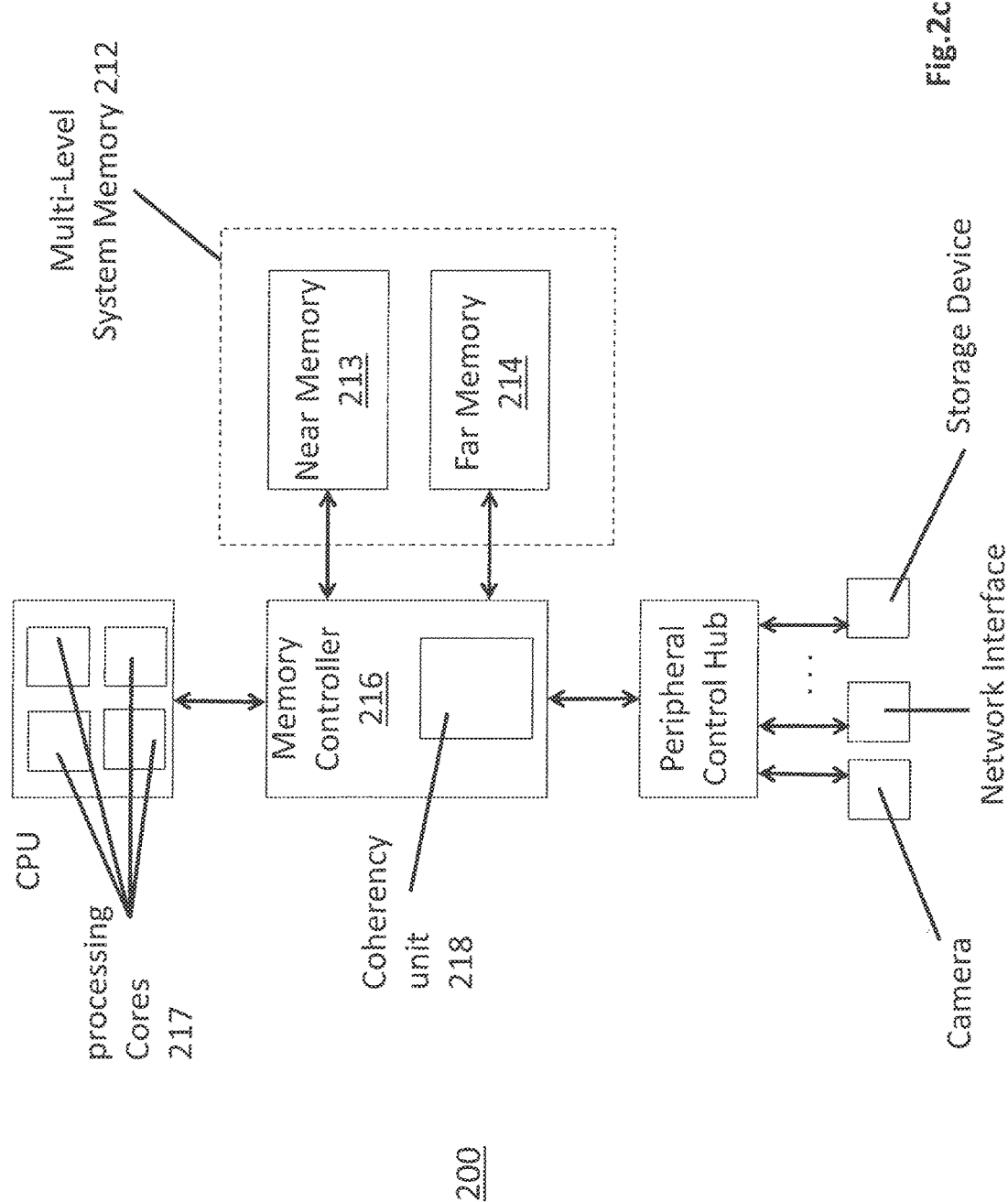
FIG. 2C shows a memory controller with a coherency unit.

Data hazards can arise in a multi-level system memory as described above. For example, competing requests for a same cache line may be concurrently received (e.g., from different threads) and/or a request for a cache line may be received in a same approximate time frame at which the cache line is transitioning between near memory and far memory. FIG. 2C shows a memory controller 216 for a multi-tired system memory and includes a coherency unit 218 for resolving such competing requests without blocking. In the case of blocking, a first process involving a cache line (e.g., transferal between near and far memories) is fully handled and completed before the handling of a second related process involving the same cache line (e.g., a read or write request for the cache lines) is permitted to begin. By contrast, as described in more detail below, the coherency unit 218 merges internal operations affecting a same cache line when possible to better improve the overall performance of the system memory from the perspective of the requestors.

FIGS. 3A through 3C_1 & 2 show some basic structural features and methodologies of the coherency unit 218 of FIG. 2C. As observed in FIG. 3A the coherency unit includes an internal buffer structure 301 (e.g., register space or internal dedicated static random access memory (SRAM)) to internally hold multiple cache lines. The buffer structure 301 permits the memory controller to internally hold and modify various cache lines in view of one or more concurrent processes targeting a particular cache line. Additionally, coherency services logic circuitry 302 controls access to near and far memory.

As will be described in more detail further below, the coherency services unit 302 not only controls the transferal of cache lines between near and far memory (including cache hit/miss status regarding reads into near memory) but is also made aware of incoming memory access requests from requestors (which, e.g., may be queued in a incoming request queue (not shown)). By being made aware of both incoming requests for cache lines and any transferals of cache lines between memory levels, the coherency services unit serves as a centralized location to merge concurrent processes directed to a same cache line.

FIG. 3A shows a first basic operation in which a read or write for a particular cache line is received by the memory controller. The coherency services unit 302 oversees a lookup into the internal buffer 301 for the cache line associated with a newly received request by looking for a match between the addresses 303 of the cache lines that are in the buffer 301 and the address of the cache line that the newly received request pertains to.

In the particular situation of FIG. 3A, the sought for cache line does not exist in the internal buffer 301. As such, as observed in FIG. 3B, a memory read consistent with the methodology of FIG. 2A is performed to load the cache line into the internal buffer 301. The cache line version that is resident in the internal buffer is referred to as a "coherence entry" within the buffer 301. As observed in FIG. 3C_1, if the original request from the requestor was a memory read request, the request is serviced by providing the contents of the coherence entry from the buffer 301 into the read request response. By contrast, as observed in FIG. 3C_2, if the original request from the requestor was a memory write request, the new information to be written that is included in the request is written over the coherence entry within the internal buffer 301. Writes may be written to a whole cache line or only a portion of a cache line. In the case of a partial write, only a subset of the cache line's contents are written over (e.g., one byte of a 64 byte cache line).

Before discussing additional, more complex processes of FIGS. 4A through 4D, it is pertinent to point out that the size of the internal buffer 301 is limited. Therefore as newly requested cache lines are written to the buffer 301 other cache lines that have been resident in the buffer 301 for some time may be evicted out. A cache line that is evicted from the internal buffer 301 follows the nominal write process of FIG. 2B. The rate at which cache lines are evicted from the internal buffer 301 depends on the size of the internal buffer 301 and the rate at which new requests are being generated by the requestors across an address space that is larger than the size of the internal buffer. Which cache lines are selected for eviction from the internal buffer 301 depends on the specific eviction policy that is designed in or configured into the coherency services unit 302. According to one embodiment, an entry in the buffer is automatically evicted if there are no pending requests for its corresponding cache line and all previous requests for the cache line have been completely satisfied.

Each of FIG. 4a through FIG. 4D start from a situation in which the cache line that the incoming requests pertain to already exists in the internal buffer (if it did not, it would be called in as described in FIGS. 3a and 3b). As observed in FIG. 4A, once a cache line is resident in the internal buffer, any subsequent read requests for that cache line are serviced by returning the cache line contents from the coherence entry rather than by performing a read from system memory.

Figure 4A:
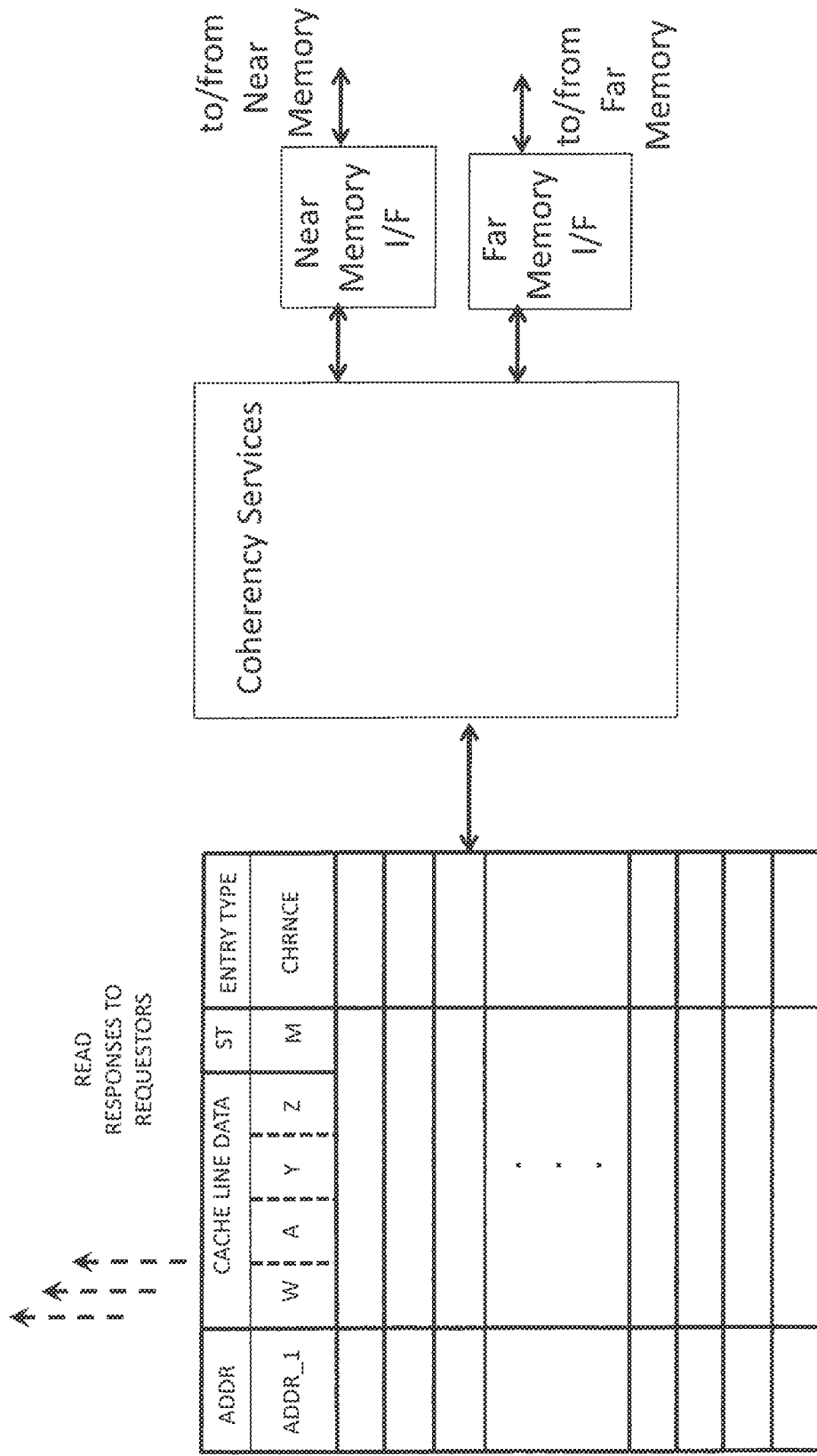
Figure 4B:
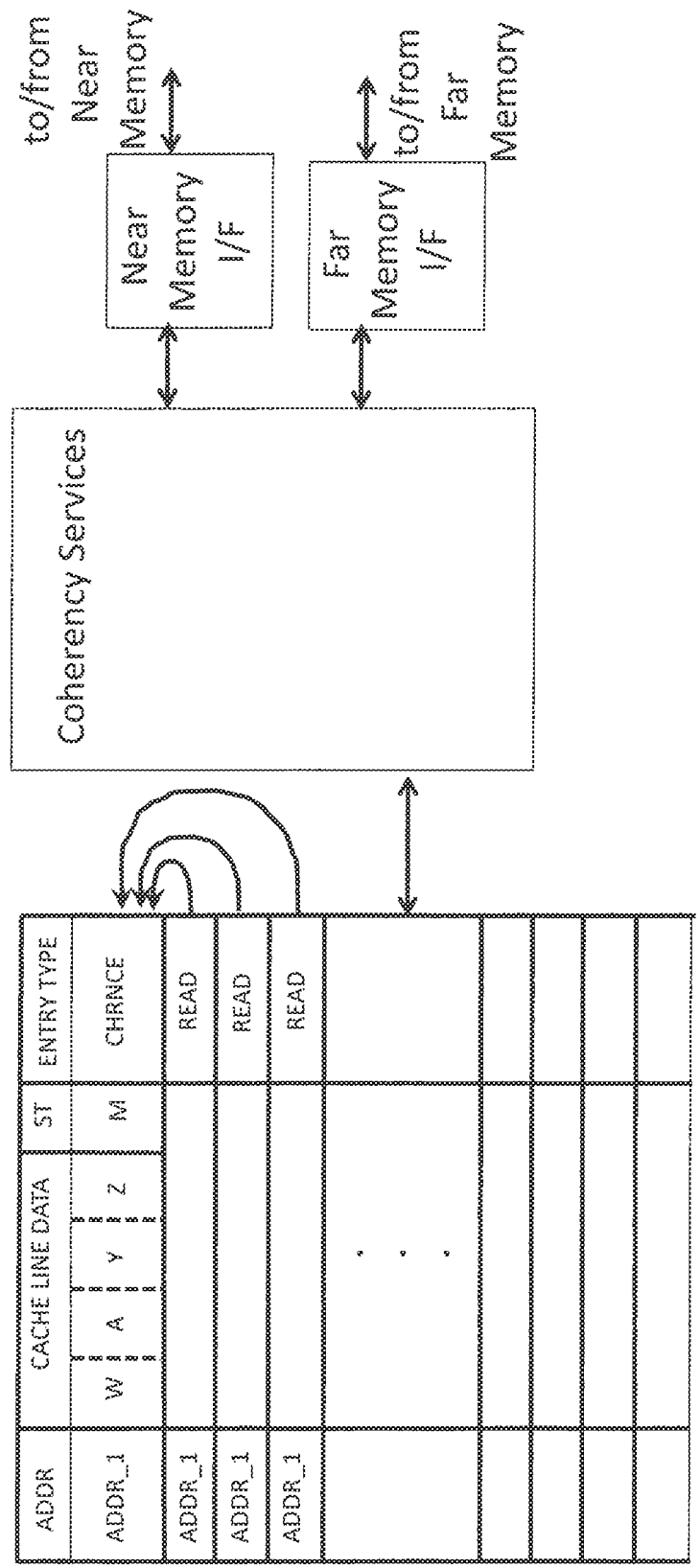

FIG. 4B shows a more detailed embodiment of a practical implementation of the internal buffer's contents. Here, it is entirely possible that the memory controller may have some queuing and/or delay generating and/or sending responses to the requestors. As such, incoming read requests are entered in the internal buffer 301 as separate individual entries along with the coherence entry. Each such entry has a pointer back to the coherence entry. Read requests are serviced by response engine logic circuitry (not shown) that is coupled to and scrolls through the entries of the internal buffer 301 for entries that pertain to a read request.

With each such read request entry the response engine extracts the coherency entry's cache line information to formulate a read response for forwarding to a requestor. Each read request entry holds information that is pertinent to its specific read request such as who the requestor is (e.g., a specific thread and/or processing core). The response engine also refers to this information in order to form a complete response. In one embodiment, a coherence entry's cache line can not be evicted from the internal buffer if it currently has existing read request entries within the internal buffer (as they represent as yet un-serviced read requests) unless and until the existing read requests are serviced.

Figure 4C:
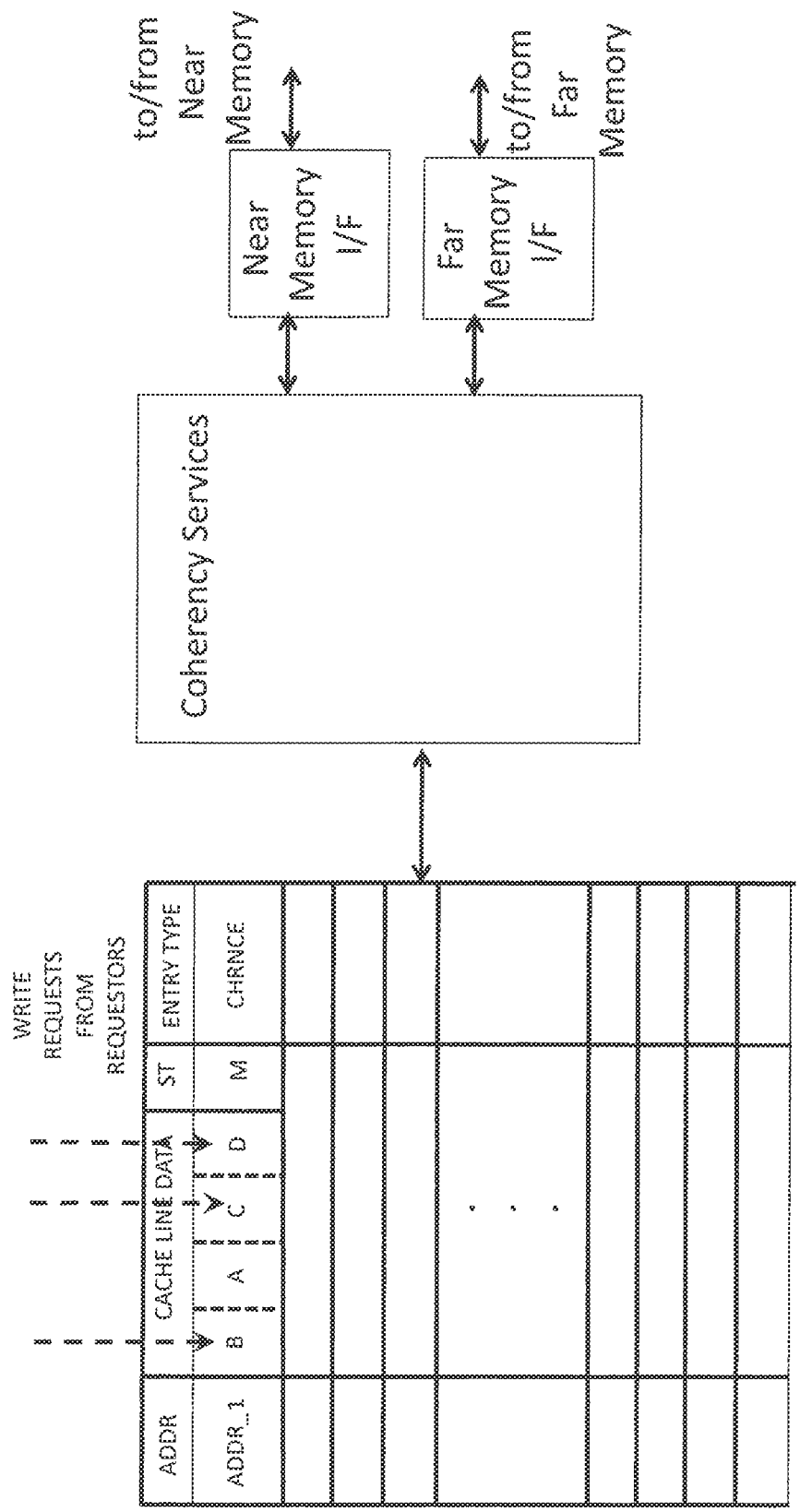

FIG. 4C shows that in the case of multiple write requests, the new information of each request is written over the coherence entry in the internal buffer. Depending on implementation, in the case of multiple write requests, new information may be written into the coherence entry in the order that it was received (a first write request's information is written before a second write request's information is written) or the corpus of new information may be merged together and written over the coherence entry in a single write operation. In the case of partial writes (a write request is only writing to a smaller section of the overall cache line) merger is straightforward when the areas to be written to by the multiple write requests do not overlap.

Figure 4D:
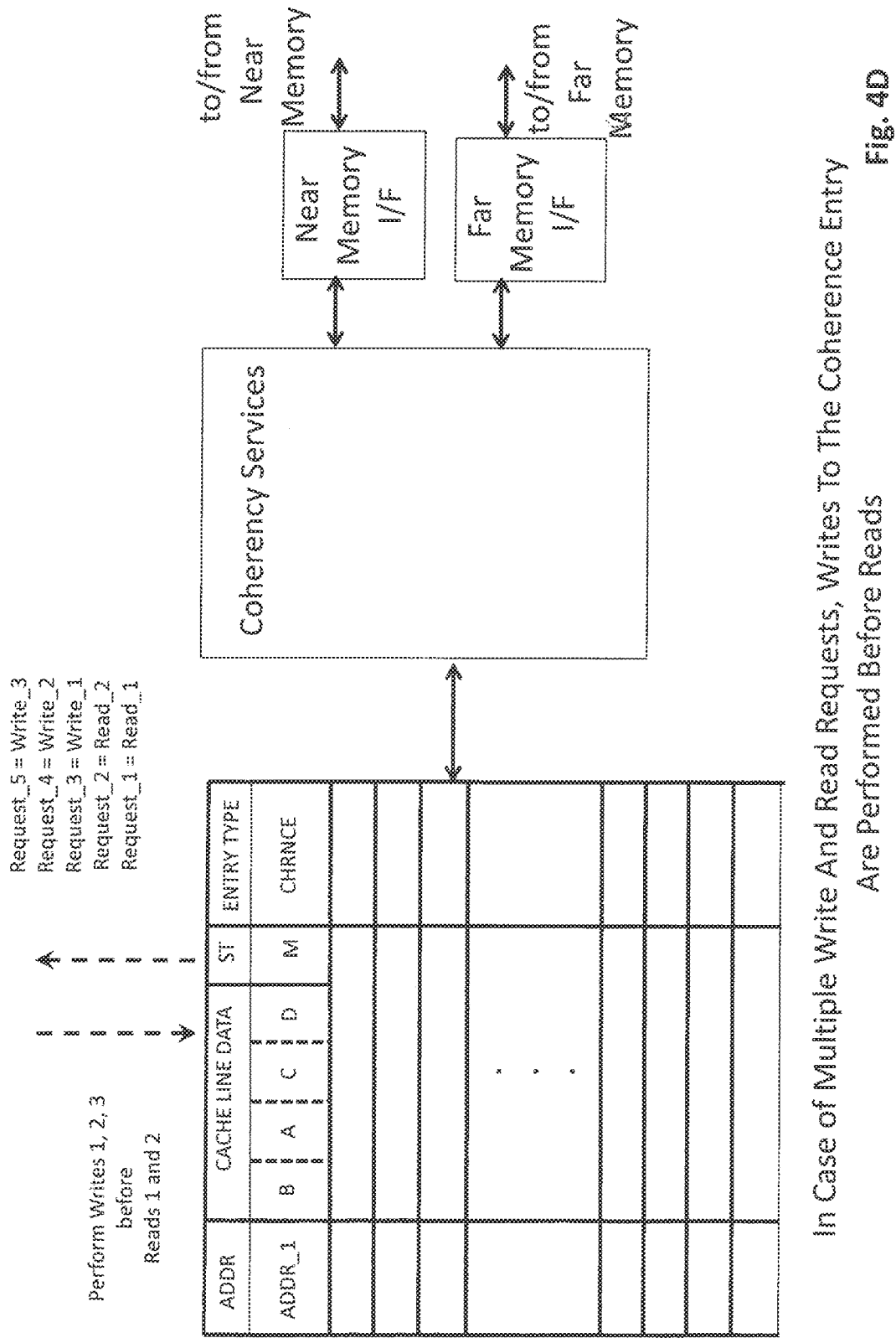

FIG. 4D shows that in the case of a mixture of incoming write and read requests for a same cache line, the coherency services unit may move the write requests ahead of the read requests relative to the order in which they were received. That is, for example, as seen in FIG. 4D, even though both reads were received by the memory controller before the three writes, the three writes are written into the coherence entry before the two reads are serviced.

Some systems may not permit writes to be moved ahead of reads as described above in FIG. 4D. Here, e.g., a computing system may include configuration space that dictates whether or not writes are permitted to be moved ahead of reads (where both target a same cache line) dynamically in the hardware of the system. Alternatively or in combination, in some systems, the handling of multiple concurrent threads by the system or the design of the processor(s) may result in potentially incorrect data if writes are permitted to be moved ahead of reads. In systems that do not permit writes to be moved ahead of reads a new coherent entry may be allocated for any write that comes after a read. Subsequent reads after multiple write entries have been entered need to review the entire write history within the buffer to understand what the content of the most version of the cache line is. Eviction of the cache line from the buffer will necessarily evict all of the entries in the buffer for the cache line.

As observed in FIGS. 4C and 4D, the coherence entry also includes information that indicates whether it has been written to since it was entered into the internal buffer. That is, an M state status is tracked for each coherence entry in the internal buffer. Here, after a cache line is called up from system memory and entered into the internal buffer it is not in the M state. However, upon the first instance of the cache line being written to while it is in the internal buffer it is transitioned into the M state.

FIGS. 5A through 5D show further additional processes in which a cache line that is in transit between near memory and far memory happens to match a coherence entry within the internal buffer. That is, the two cache lines have the same address. For example, consider a situation in which a cache line has been evicted from the internal buffer. As discussed earlier, the write process of FIG. 2B will subsequently be performed in order to write the cache line that has been evicted from the internal buffer into system memory. From FIG. 2B, the first sequence of the procedure is to perform a lookup 211 into near memory for the cache line. In the case of a hit there is no issue as the cache line that is evicted from the internal buffer will be written over the cache line that was found in near memory 212.

Figure 5A:
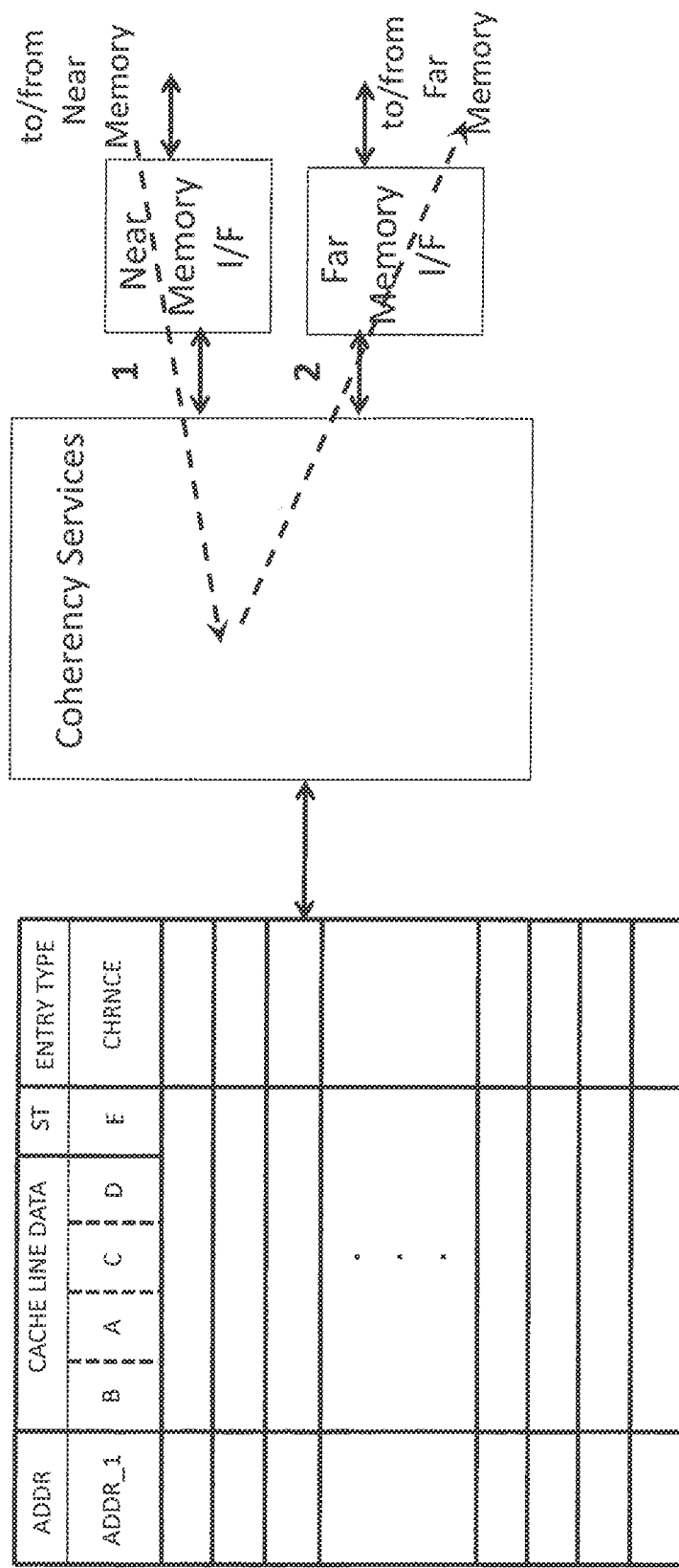
Figure 5B:
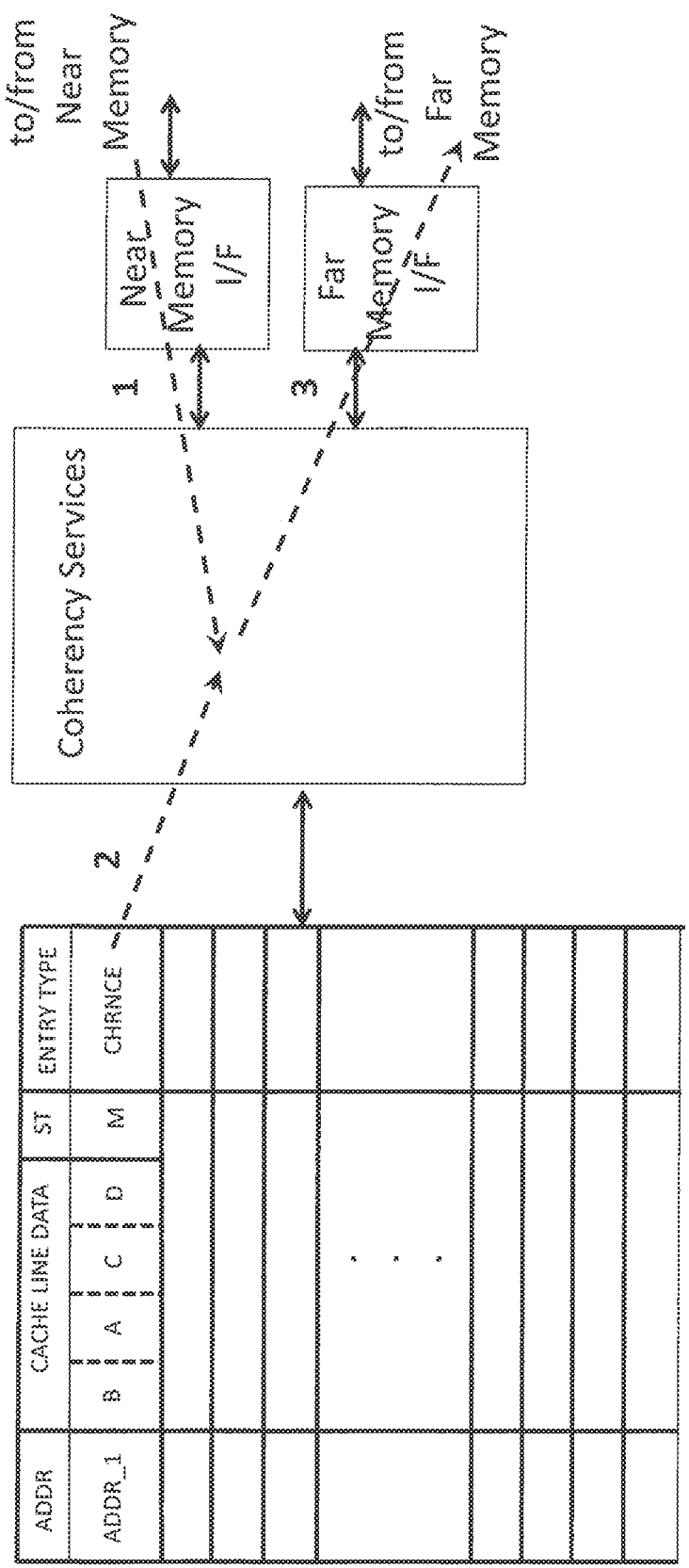

However in the case of a cache miss, the writing of the cache line that was evicted from the internal buffer into near memory may cause the eviction of another cache line from near memory that now needs to be written back into far memory 215. FIGS. 5A through 5C pertain to the situation in which the cache line that has been evicted from near memory happens to match a coherence entry cache line that is resident in the internal buffer.

In this case, referring to FIG. 5A, if the coherence entry in the internal buffer is not in the M state, there is no merger of the coherence entry's contents with the cache line that is being evicted from near memory. As such, the cache line that is evicted from near memory is written back to far memory if it is in the M state. If it is not in the M state there is no write back to far memory.

Referring to FIG. 5B, if the coherence entry in the internal buffer is in the M state it is merged with the cache line that is being evicted from near memory and the resultant is written back into far memory (the merger may be accomplished with circuitry that combines the data of the two cache lines with newer data being written over older data). Note that if a subsequent write request is to arrive for the cache line that is handled in the buffer, the coherency unit will recognize that the most recent data for the cache line is within the buffer which will require the cache line to be written back into system memory should the cache line be de-allocated/evicted from the buffer.

FIG. 5C shows the situation of FIG. 5B but where one or more write requests have been received commensurate/concurrently with the eviction of the cache line from near memory (e.g., the requests may be resident in an incoming request queue of the memory controller). Here, the newly received write requests are merged into the coherence entry and the resultant is merged into the cache line that is being evicted from near memory. The total resultant is then written back to far memory.

Figure 5D:
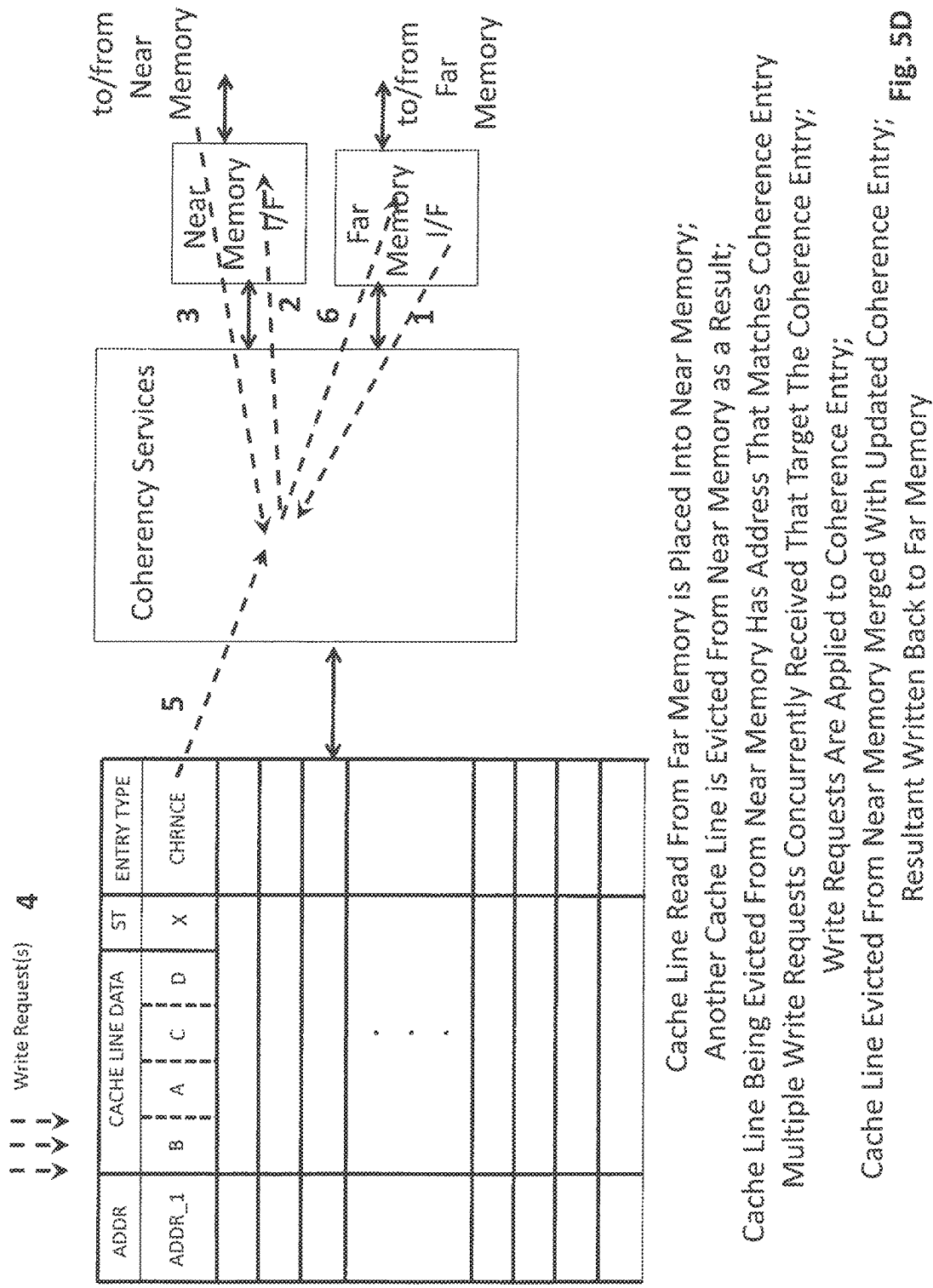

FIG. 5D shows that the processes of FIG. 5B or 5C can also arise in the case where a cache line read from far memory is being newly entered into the internal buffer. Here, recall from FIG. 3A that in the case where a new read or write request is received for a cache line that is not resident in the internal buffer, the cache line is fetched from system memory before the request can be serviced. If the cache line is found in near memory no eviction of a cache line from near memory transpires and so the inclusion of the cache line into the internal buffer is straight forward.

However in the case where the cache line being retrieved is not found in near memory but instead has to be fetched from far memory, recall that according to the process of FIG. 2A the same cache line may then be inserted into near memory 204. The insertion of the cache line into near memory may cause an eviction of another cache line from near memory in which case any of the processes of FIG. 5B or 5C may transpire.

For any of the processes of FIGS. 5A through 5D, any incoming read requests that target the coherence entry may read directly from the coherence entry. As discussed with respect to FIG. 4D, generally, any concurrent write requests should precede the read requests in terms of the order of their execution.

FIG. 6 provides an embodiment of a hardware implementation of the coherency unit of FIG. 2c. As observed in FIG. 6, the coherency services unit 602 includes a number of state machines and other logic circuitry designed to implement the processes described above with respect to FIGS. 3 through 5.

Notably, the coherency services unit 602 includes a Modified Exclusive Shared Invalid (MESI) state machine 603 that is able to track the formal MESI state of each coherency cache line in the internal buffer 601. Toa larger extent, handling of the M state has already been discussed in the sense that anytime a fresh cache line is called up from system memory, any write activity to the coherency version that resides in the internal buffer will cause the cache line to transition to the M state. Additionally, other requests may arrive that cause other types of MESI state transitions. For example, an explicit request may be received to invalidate the cache line in which case the cache line will transition to the Invalid (I) state, or, multiple read requests may arrive from two different requestors which will transition the cache line to the Shared (S) state consistent with MESI protocol semantics. Additionally, in various embodiments, when a coherency cache line is evicted from the internal buffer 601 it is only written back to system memory if it is currently in the M state. Further still, whenever a process is to take place in which a cache line in the M state that will be written in near memory will also be backed up with a duplicate entry in far memory, the cache line version that is written in near memory may be written as not being in the M state (e.g., by being written in the E state). Likewise, if no such backup is to occur the cache line may be written into near memory as being within the M state.

The coherency services unit 602 also includes a request ordering state machine 605. The request ordering state machine is responsible for implementing the order in which incoming requests are serviced (e.g., moving writes ahead of reads). Here, note that the coherency services unit 602 is coupled to a request queue 603 where received requests are buffered before actually being serviced. The request ordering state machine may snoop the contents of the queue 603 to rearrange the order between requests as they were received by the memory controller vs. the order they are actually serviced.

The coherency services unit 602 also includes a read response state machine 606. As discussed above with respect to FIG. 4B, in an embodiment, reads are serviced by polling the read entries of the internal buffer 601 and servicing them. Here, the read entries include information germane to their particular read request (e.g., the identity of the requestor) and refer back to the coherence entry for the actual current version of the cache line. The read response state machine 606 effectively performs these actions and formulates formal responses from the contents of the entries.

The coherency services unit 602 also includes an eviction state machine 607. The eviction state machine 607 determines which coherence entries within the internal buffer are to be pushed out to system memory in response to, e.g., new requests being received at the memory controller that overwhelm the size of the internal buffer. The eviction state machine 607 may communicate with the read response state machine 606 to ensure that a coherence entry having dependent read entries within the internal buffer 601 is not evicted before the dependent read requests are serviced.

The coherency services unit 602 also includes a lookup state machine to perform reads from near memory and/or far memory and writes to near memory and/or far memory in conjunction with discovering matching coherency entries in the internal buffer in order to effectively implement any of the processes discussed above with respect to FIGS. 5A through 5D.

Although not depicted in FIG. 6, in various embodiments, a tag array may be included in the overall design to track which cache line(s) is/are in near memory for the address that a particular read or write operation pertain to. For example, in the case of a direct mapped cache, there is only one cache "slot" for a predetermined set of addresses. For an incoming request having a particular address, the tag array holds information indicating which one of the addresses within the set is currently occupying the slot. In further embodiments the tag array also identifies what state the cached cache line is in (e.g., M or otherwise). Thus, in various embodiments, the tag array is the primary structure that is referred to during a near memory cache look-up. The tag array may be kept, e.g., in near memory (in which case a lookup into near memory requires a read to near memory), or on the host side of the system (e.g., within the memory controller coupled to the coherency services unit 602.

FIG. 7 shows a depiction of an exemplary computing system 700 such as a personal computing system (e.g., desktop or laptop) or a mobile or handheld computing system such as a tablet device or smartphone. As observed in FIG. 7, the basic computing system may include a central processing unit 701 (which may include, e.g., a plurality of general purpose processing cores and a main memory controller disposed on an applications processor or multi-core processor), system memory 702, a display 703 (e.g., touchscreen, flat-panel), a local wired point-to-point link (e.g., USB) interface 04, various network I/O functions 705 (such as an Ethernet interface and/or cellular modem subsystem), a wireless local area network (e.g., WiFi) interface 706, a wireless point-to-point link (e.g., Bluetooth) interface 707 and a Global Positioning System interface 708, various sensors 709_1 through 709_N (e.g., one or more of a gyroscope, an accelerometer, a magnetometer, a temperature sensor, a pressure sensor, a humidity sensor, etc.), a camera 710, a battery 711, a power management control unit 712, a speaker and microphone 713 and an audio coder/decoder 714.

An applications processor or multi-core processor 750 may include one or more general purpose processing cores 715 within its CPU 701, one or more graphical processing units 716, a memory management function 717 (e.g., a memory controller) and an I/O control function 718. The general purpose processing cores 715 typically execute the operating system and application software of the computing system. The graphics processing units 716 typically execute graphics intensive functions to, e.g., generate graphics information that is presented on the display 703. The memory control function 717 interfaces with the system memory 702. The system memory 702 may be a multi-level system memory such as the multi-level system memory 212c observed in FIG. 2C. During operation, data and/or instructions are typically transferred between deeper non volatile (e.g., "disk") storage 720 and system memory 702. The power management control unit 712 generally controls the power consumption of the system 700.

Each of the touchscreen display 703, the communication interfaces 704-707, the GPS interface 708, the sensors 709, the camera 710, and the speaker/microphone codec 713, 714 all can be viewed as various forms of I/O (input and/or output) relative to the overall computing system including, where appropriate, an integrated peripheral device as well (e.g., the camera 710). Depending on implementation, various ones of these I/O components may be integrated on the applications processor/multi-core processor 750 or may be located off the die or outside the package of the applications processor/multi-core processor 750.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
performing the following with a system memory controller coupled to a multi-level system memory, the system memory controller coupled between the multi-level system memory and at least one processing core, the system memory controller and the at least one processing core integrated on a same semiconductor chip:
receiving a read request for a cache line;
referring to a coherency buffer within said memory controller for said cache line;
issuing a read request to a level of said multi-level system memory in response to said cache line not being found in said coherency buffer;
populating said coherency buffer with said cache line; and
servicing said read request by providing said cache line.

2. The method of claim 1 further comprising:
receiving a second read request for said cache line;
referring to said coherency buffer for said cache line and finding said cache line in said coherency buffer;
servicing said second read request by providing said cache line from said coherency buffer.

3. The method of claim 2 further comprising creating a new entry in said coherency buffer for said second read request that refers to an entry in said coherency buffer that contains said cache line.

4. The method of claim 1 further comprising:
receiving a write request for said cache line;
referring to said coherency buffer for said cache line and finding said cache line in said coherency buffer;
writing over said cache line within said coherency buffer to service said write request and indicating within said cache line buffer that said cache line has been modified.

5. The method of claim 4 wherein said write request seeks to write over only a portion of said cache line's data.

6. The method of claim 4 wherein upon a second cache line having a same address as said cache line being evicted from a memory side cache implemented with a level of said multi-level system memory, performing the following:
referring to said coherency buffer to recognize that said cache line has been modified; and,
merging said cache line and said second cache line and writing a resultant cache line into a deeper level of said multi-level system memory.

7. The method of claim 4 wherein upon a second cache line having a same address as said cache line being evicted from a memory side cache implemented with a level of said multi-level system memory, performing the following:
referring to said coherency buffer to recognize there are one or more pending write requests for said cache line; and,
merging said one or more pending writes requests, said cache line and said second cache line and writing a resultant cache line into a deeper level of said multi-level system memory.

8. The method of claim 7 wherein said eviction of said second cache line was caused by a read request for another, different cache line being inserted into said level of said multi-level system after a read of said another, different cache line from said deeper level of said multi-level system memory.

9. An apparatus, comprising:
a system memory controller having an interface to couple to a multi-level system memory, wherein, different respective levels of said multi-level system memory are to keep cache lines of information in their entirety, circuitry of said system memory controller other than said interface being coupled between said interface and at least one processing core, said system memory controller and said at least one processing core implemented on a semiconductor chip, said circuitry of said system memory controller also including:
a coherency buffer circuit to keep cache lines for which read and/or write requests have been received;
coherency services logic circuitry coupled to said interface and said coherency buffer, said coherency services logic circuitry to merge a cache line that has been evicted from a level of said multi-level system memory with another version of said cache line within said coherency buffer before writing said cache line back to a deeper level of said multi-level system memory in response to said another version of said cache line being in a modified state.

10. The apparatus of claim 9 wherein said system memory controller includes logic circuitry to:
perform a read from the level in response to a read or write request;
service said read or write request if said read returned a targeted cache line of said read or write request;
perform a respective read/write from/to said deeper level if said read from said level did not return said targeted cache line.

11. The apparatus of claim 9 wherein said system memory controller includes logic circuitry to place a cache line read from said deeper level into said level.

12. The apparatus of claim 9 wherein said coherency services logic circuitry includes logic circuitry to evict a cache line from said coherency buffer.

13. The apparatus of claim 9 wherein said coherency services logic circuitry is to add entries in said coherency buffer for each new read request that targets a cache line in said coherency buffer, wherein said entries refer to said cache line in said coherency buffer.

14. The apparatus of claim 9 wherein said coherency services logic circuitry includes logic circuitry to move pending writes to a cache line ahead of pending reads from the same cache line.

15. A computing system, comprising:
a plurality of processing cores disposed on a semiconductor chip;
a system memory controller coupled to said plurality of processing cores, said system memory controller disposed on said memory chip, said system memory controller having an interface that is coupled to a multi-level system memory, circuitry of said system memory controller other than said interface being coupled between said interface and said plurality of processing cores, wherein, different respective levels of said multi-level system memory are to keep cache lines of information in their entirety, said system memory controller also including:
a coherency buffer to keep cache lines for which read and/or write requests have been received;
coherency services logic circuitry coupled to said interface and said coherency buffer, said coherency services logic circuitry to merge a cache line that has been evicted from a level of said multi-level system memory with another version of said cache line within said coherency buffer before writing said cache line back to a deeper level of said multi-level system memory in response to said another version of said cache line being in a modified state.

16. The computing system of claim 15 wherein said system memory controller includes logic circuitry to:

perform a read from the level in response to a read or write request;

service said read or write request if said read returned a targeted cache line of said read or write request;

perform a respective read/write from/to said deeper level if said read from said level did not return said targeted cache line.

17. The computing system of claim 15 wherein said system memory controller includes logic circuitry to place a cache line read from said deeper level into said level.

18. The computing system of claim 15 wherein said coherency services logic circuitry includes logic circuitry to evict a cache line from said coherency buffer.

19. The computing system of claim 15 wherein said coherency services logic circuitry is to add entries in said coherency buffer for each new read request that targets a cache line in said coherency buffer, wherein said entries refer to said cache line in said coherency buffer.

20. The computing system of claim 15 wherein said coherency services logic circuitry includes logic circuitry to move pending writes to a cache line ahead of pending reads from the same cache line.

21. An apparatus, comprising:

a system memory controller having an interface to couple to a multi-level system memory, wherein, different respective levels of said multi-level system memory are to keep cache lines of information in their entirety, circuitry of said system memory controller other than said interface being coupled between said interface and at least one processing core, said system memory controller and said at least one processing core implemented on a semiconductor chip, said circuitry of said system memory controller also including:

a coherency buffer circuit to keep cache lines for which read and/or write requests have been received;

coherency services logic circuitry coupled to said interface and said coherency buffer, said coherency services logic circuitry to merge a cache line that has been evicted from a level of said multi-level system memory with another version of said cache line within said coherency buffer before writing said cache line back to a deeper level of said multi-level system memory in response to said system memory controller having a pending write request for said cache line, wherein, content of said write request is merged into said another version of said cache line.

22. The apparatus of claim 21 wherein said system memory controller includes logic circuitry to:

perform a read from the level in response to a read or write request;

service said read or write request if said read returned a targeted cache line of said read or write request;

perform a respective read/write from/to said deeper level if said read from said level did not return said targeted cache line.

23. The apparatus of claim 21 wherein said system memory controller includes logic circuitry to place a cache line read from said deeper level into said level.

24. The apparatus of claim 21 wherein said coherency services logic circuitry includes logic circuitry to evict a cache line from said coherency buffer.

25. The apparatus of claim 21 wherein said coherency services logic circuitry is to add entries in said coherency buffer for each new read request that targets a cache line in said coherency buffer, wherein said entries refer to said cache line in said coherency buffer.

26. The apparatus of claim 21 wherein said coherency services logic circuitry includes logic circuitry to move pending writes to a cache line ahead of pending reads from the same cache line.

27. The apparatus of claim 21 wherein said system memory controller is within a computing system comprising one or more processing cores and a network interface.

* * * * *